United States Patent
Park et al.

(10) Patent No.: US 12,242,131 B2
(45) Date of Patent: **\*Mar. 4, 2025**

(54) DUAL CAMERA MODULE AND OPTICAL INSTRUMENT

(71) Applicant: LG INNOTEK CO., LTD., Seoul (KR)

(72) Inventors: Sang Ok Park, Seoul (KR); Sang Jun Min, Seoul (KR); Seong Min Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 204 days.

This patent is subject to a terminal disclaimer.

(21) Appl. No.: 17/937,232

(22) Filed: Sep. 30, 2022

(65) Prior Publication Data

US 2023/0030876 A1 Feb. 2, 2023

Related U.S. Application Data

(63) Continuation of application No. 16/319,628, filed as application No. PCT/KR2017/007582 on Jul. 14, 2017, now Pat. No. 11,493,725.

(30) Foreign Application Priority Data

Jul. 29, 2016 (KR) .................. 10-2016-0096764

(51) Int. Cl.
*G02B 7/04* (2021.01)
*G03B 13/36* (2021.01)
(Continued)

(52) U.S. Cl.
CPC .............. *G02B 7/04* (2013.01); *G03B 13/36* (2013.01); *H02K 11/215* (2016.01); *H02K 11/25* (2016.01);
(Continued)

(58) Field of Classification Search
USPC ........................................................ 396/80
See application file for complete search history.

(56) References Cited

U.S. PATENT DOCUMENTS 10,694,092 B2 * 6/2020 Lee ................. H04N 23/51
11,493,725 B2 * 11/2022 Park ................ H04M 1/02
(Continued)

FOREIGN PATENT DOCUMENTS

CN          203933331 U     11/2014
CN          104935792 A      9/2015
(Continued)

OTHER PUBLICATIONS

International Search Report in International Application No. PCT/KR2017/007582, filed Jul. 14, 2017.
(Continued)

*Primary Examiner* — Clayton E. LaBalle
*Assistant Examiner* — Warren K Fenwick
(74) *Attorney, Agent, or Firm* — Saliwanchik, Lloyd & Eisenschenk

(57) ABSTRACT

The present embodiment relates to a dual camera module, in which a first lens driving device is spaced apart from and arranged in parallel with a second lens driving device, a first Hall sensor of the first lens driving device is disposed is disposed at a corner portion which is spaced most apart from a second sensing magnet of the second lens driving device, among a plurality of corner portions of a first housing; and a second Hall sensor of the second lens driving device is disposed at a corner portion which is spaced most apart from the first Hall sensor, among a plurality of corner portions of a second housing.

20 Claims, 13 Drawing Sheets

(51) Int. Cl.
- *H02K 11/215* (2016.01)
- *H02K 11/25* (2016.01)
- *H02K 41/035* (2006.01)
- *H04N 23/45* (2023.01)
- *H04N 23/54* (2023.01)
- *H04N 23/55* (2023.01)
- *H04N 23/57* (2023.01)
- *H04N 23/67* (2023.01)
- *H04N 23/90* (2023.01)

(52) U.S. Cl.
CPC ......... *H02K 41/0356* (2013.01); *H04N 23/45* (2023.01); *H04N 23/54* (2023.01); *H04N 23/55* (2023.01); *H04N 23/57* (2023.01); *H04N 23/67* (2023.01); *H04N 23/90* (2023.01)

(56) References Cited

U.S. PATENT DOCUMENTS

| | | | | |
|---|---|---|---|---|
| 11,513,424 B2 * | 11/2022 | Park | ........................ | H04N 23/90 |
| 11,582,376 B2 * | 2/2023 | Lee | ........................ | G02B 7/021 |
| 11,743,562 B2 * | 8/2023 | Lee | ........................ | H04N 23/45 |
| | | | | 348/218.1 |
| 2016/0018720 A1 | 1/2016 | Bachar et al. | | |
| 2016/0320584 A1 | 11/2016 | Lee et al. | | |
| 2023/0353848 A1 * | 11/2023 | Lee | ........................ | G02B 7/021 |

FOREIGN PATENT DOCUMENTS

| | | |
|---|---|---|
| JP | 3-120495 U | 12/1991 |
| JP | 2014-178452 A | 9/2014 |
| KR | 10-2013-0024160 A | 3/2013 |
| KR | 10-1343197 B1 | 12/2013 |
| KR | 10-2015-0064471 A | 6/2015 |
| KR | 10-2015-0113675 A | 10/2015 |
| WO | 2014/199338 A2 | 12/2014 |
| WO | 2015/124966 A1 | 8/2015 |

OTHER PUBLICATIONS

Office Action dated May 29, 2020 in Chinese Application No. 201780046513.8.
Office action dated Apr. 12, 2022 in U.S. Appl. No. 16/319,628.
Notice of Allowance dated Jun. 30, 2022 in U.S. Appl. No. 16/319,628.
Office Action dated Sep. 30, 2022 in Korean Application No. 10-2016-0096764.

* cited by examiner

DUAL CAMERA MODULE AND OPTICAL INSTRUMENT

CROSS-REFERENCE TO RELATED APPLICATIONS

This application is a continuation of Ser. No. 16/319,628, filed Jan. 22, 2019; which is the U.S. national stage application of International Patent Application No. PCT/KR2017/007582, filed Jul. 14, 2017, which claims the benefit under 35 U.S.C. § 119 of Korean Application No. 10-2016-0096764, filed Jul. 29, 2016, the disclosures of each of which are incorporated herein by reference in their entirety.

TECHNICAL FIELD

The teachings in accordance with exemplary and non-limiting embodiments of this invention relate generally to a dual camera module and an optical instrument.

BACKGROUND ART

This section provides background information related to the present invention, which is not necessarily prior art.

Concomitant with generalization of wide use of various mobile terminals, and commercialization of wireless internet services, demands by consumers related to mobile terminals are also diversified to allow various types of peripheral devices to be mounted on the mobile terminals.

Among the representative items thereof, there is mentioned a camera module photographing a subject in a picture or a video. Recently, researches are being briskly waged on a dual camera module in which two camera modules are arranged in parallel. However, when two camera modules are disposed nearby in order to obtainment of performance of dual camera, a magnetic force of a magnet of any one camera in two cameras may be disadvantageously affected on another camera module.

DETAILED DESCRIPTION OF THE INVENTION

Technical Subject

In order to solve the aforementioned disadvantages/problems, an exemplary embodiment of the present invention is to provide a dual camera module configured to minimize mutual influence of magnets at two parallel-arranged camera modules. Particularly, an exemplary embodiment of the present invention is to provide a dual camera module comprising parallel-arranged two AF and AF feedback camera modules, configured to inhibit a bobbin disposed with a sensing magnet of any one AF and AF feedback camera module from being disengaged from a normal position by a magnet of another AF and AF feedback camera module or to minimize a tilting phenomenon.

Furthermore, an exemplary embodiment of the present invention is to provide an optical instrument comprising the dual camera module.

Technical Solution

A dual camera module, comprising:

In one general aspect of the present invention, there is provided a dual camera module, the dual camera module comprising:

a first lens driving device comprising a first housing, a first bobbin accommodated into an inside of the first housing, a first driving magnet disposed at the first housing, a first coil disposed at the first bobbin to be opposite to the first driving magnet, a first support member coupled to the first housing and the first bobbin to movably support the first bobbin along a first optical axis, a first sensing magnet disposed at the first bobbin, a first compensation magnet disposed at the first bobbin to be symmetrical with the first sensing magnet about the first optical axis, and a first Hall sensor disposed at the first housing to detect the first sensing magnet;

a second lens driving device comprising a second housing, a second bobbin accommodated into an inside of the second housing, a second driving magnet disposed at the second housing; a second coil disposed at the second bobbin to be opposite to the second driving magnet, a second support member coupled to the second housing and to the second bobbin to movably support the second bobbin along a second optical axis, a second sensing magnet disposed at the second bobbin, a second compensation magnet disposed at the second bobbin to be symmetrical with the second sensing magnet about the second optical axis, and a second Hall sensor disposed at the second housing to detect the second sensing magnet, wherein, the first lens driving device is parallel spaced apart from the second lens driving device, the first Hall sensor is disposed at a corner portion most spaced apart from the second sensing magnet among a plurality of corner portions of the first housing, and the second Hall sensor is disposed at a corner portion most spaced apart from the first Hall sensor among a plurality of corner portions of the second housing.

Preferably, but not necessarily, the first housing may comprise a first side surface, a third side surface disposed opposite to the first side surface, and second and fourth side surfaces mutually and oppositely disposed between the first and third side surfaces, the second housing may comprise a fifth side surface opposite to the first side surface, a seventh side surface disposed opposite to the fifth side surface, and sixth and eighth side surfaces mutually and oppositely disposed between the fifth and seventh side surfaces, and the first Hall sensor may be disposed between the second and third side surfaces, and the second Hall sensor may be disposed between the sixth and seventh side surfaces.

Preferably, but not necessarily, the first driving magnet may comprise first to fourth magnets respectively disposed at the first to fourth side surfaces of the first housing, and the second driving magnet may comprise fifth to eighth magnets respectively disposed at the fifth to eighth magnets of the second housing, each of the first to eighth magnets having a flat plate shape.

Preferably, but not necessarily, the first to fourth magnets may be symmetrical with the fifth to eighth magnets about a first imaginary line, which is a virtual straight line, and the first imaginary line may be disposed on a plane surface comprising the first and second optical axes, and may be parallel with the first and second optical axes.

Preferably, but not necessarily, the first to fourth magnets may be mutually symmetrical about the first optical axis, and the fifth to eighth magnets may be mutually symmetrical about the second optical axis.

Preferably, but not necessarily, the first magnet may not be overlapped with the fifth magnet to a direction perpendicular to the first optical axis.

Preferably, but not necessarily, the first housing may comprise first to fourth corner portions disposed among the first to fourth side surfaces, the first magnet may be disposed closer to the first corner portion than the fourth corner portion, the second magnet may be disposed closer to the first corner portion than the second corner portion, the third magnet may be disposed closer to the third corner portion than the second corner portion, and the fourth magnet may be disposed closer to the third corner portion than the fourth corner portion, wherein the second housing may comprise fifth to eighth corner portions disposed among the fifth to eighth side surfaces, and the fifth magnet may be disposed closer to the fifth corner portion than the eighth corner portion, the sixth magnet may be disposed closer to the fifth corner portion than the sixth corner portion, the seventh magnet may be disposed closer to the seventh corner portion than the sixth corner portion, and the eighth magnet may be disposed closer to the seventh corner portion than the eighth corner portion.

Preferably, but not necessarily, the first side surface may be disposed parallel with the fifth side surface, and the first side surface may be overlapped with the fifth side surface to a direction perpendicular to the first optical axis.

Preferably, but not necessarily, the first lens driving device may further comprise first cover member accommodating the first housing thereinside, and the second lens driving device may further comprise a second cover member accommodating the second housing thereinside, wherein the first cover member may be spaced apart from the second cover member by 1 mm~5 mm.

Preferably, but not necessarily, at least one of the first to second Hall sensors may comprise a temperature detecting function.

Preferably, but not necessarily, the first coil may comprise eight side surfaces, and the first sensing magnet may be disposed on any one inside of the eight side surfaces of the first coil.

Preferably, but not necessarily, the dual camera module may further comprise:
a first PCB disposed with the first lens driving device; and
a second PCB disposed with the second lens driving device, wherein each of the first and second PCBs may comprise a terminal for being electrically connected to an outside.

Preferably, but not necessarily, the dual camera module may further comprise:
a first PCB disposed with the first lens driving device; and
a second PCB disposed with the second lens driving device, wherein the first and second PCBs may be integrally formed.

A dual camera module according to a modification, comprising:
a first lens driving device comprising a first housing, a first bobbin accommodated into an inside of the first housing, a first driving magnet disposed at the first housing, a first coil disposed at the first bobbin to be opposite to the first driving magnet, a first support member coupled to the first housing and the first bobbin to movably support the first bobbin along a first optical axis, a first sensing magnet disposed at the first bobbin, and a first Hall sensor disposed at the first housing to detect the first sensing magnet;
a second lens driving device comprising a second housing, a second bobbin accommodated into an inside of the second housing, a second driving magnet disposed at the second housing; a second coil disposed at the second bobbin to be opposite to the second driving magnet, a second support member coupled to the second housing and to the second bobbin to movably support the second bobbin along a second optical axis, a second sensing magnet disposed at the second bobbin, and a second Hall sensor disposed at the second housing to detect the second sensing magnet, wherein, the first lens driving device is parallel spaced apart from the second lens driving device, the first Hall sensor is disposed at a corner portion most spaced apart from the second sensing magnet among a plurality of corner portions of the first housing, and the second Hall sensor is disposed at a corner portion most spaced apart from the first Hall sensor among a plurality of corner portions of the second housing.

A dual camera module according to a modification, comprising:
a first lens driving device comprising a first housing, a first bobbin accommodated into an inside of the first housing, a first driving magnet disposed at the first housing, a first coil disposed at the first bobbin to be opposite to the first driving magnet, a first support member coupled to the first housing and the first bobbin to movably support the first bobbin along a first optical axis, a first balancing magnet disposed at the first bobbin, and a second balancing magnet symmetrical with the first balancing magnet about a first optical axis;
a second lens driving device comprising a second housing, a second bobbin accommodated into an inside of the second housing, a second driving magnet disposed at the second housing; a second coil disposed at the second bobbin to be opposite to the second driving magnet, a second support member coupled to the second housing and to the second bobbin to movably support the second bobbin along a second optical axis, a third balancing magnet disposed at the second bobbin, and a fourth balancing magnet disposed at the second bobbin and symmetrical with the second balancing magnet about the second optical axis, wherein, the first lens driving device is parallel spaced apart from the second lens driving device, the first balancing magnet is disposed at a corner portion most spaced apart from the third balancing magnet among a plurality of corner portions of the first housing, and the third balancing magnet is oppositely disposed at a corner portion most spaced apart from the first balancing magnet among a plurality of corner portions of the second housing.

In another modification, a dual camera module comprising:
a first lens driving device comprising a first housing, a first bobbin accommodated into an inside of the first housing, a first driving magnet disposed at the first housing, a first coil disposed at the first bobbin to be opposite to the first driving magnet, a first support member coupled to the first housing and the first bobbin to movably support the first bobbin along a first optical axis; and
a second lens driving device comprising a second housing, a second bobbin accommodated into an inside of the second housing, a second driving magnet disposed at the second housing; a second coil disposed at the second bobbin to be opposite to the second driving magnet, a second support member coupled to the second housing and to the second bobbin to movably support the second bobbin along a second optical axis, wherein the first lens driving device may be parallel spaced apart from the second lend driving device, a lateral surface of one side of the first housing may be opposite to a lateral surface of one side of second housing, the first driving magnet may comprise a first magnet disposed at a lateral surface of one side of first housing, the second driving magnet may comprise a second magnet disposed at a lateral surface of one side of second housing, a center of first magnet and a center of second magnet may be mutually oppositely disposed about a virtual plane surface comprising an optical axis of first lens driving device and an optical axis of second lens driving device.

Preferably, but not necessarily, the first lens driving device may further comprise a first sensing magnet disposed on the bobbin, and a first compensation magnet disposed on the first bobbin to be symmetrically disposed with the first sensing magnet about an optical axis of the first lens driving device, wherein a center of first compensation magnet and a center of the first magnet may be mutually oppositely disposed about a virtual plane, and a center of first sensing magnet and a center of the first magnet may be disposed on a same side about a virtual plane.

Preferably, but not necessarily, the first lens driving device may further comprise a first Hall sensor disposed at the first housing to detect the first sensing magnet, and a center of the first Hall sensor and a center of first magnet may be disposed on a same side about a virtual plane.

In another general aspect of the present invention, there is provided an optical instrument, comprising:
a main body;
a dual camera module disposed at the main body to photograph an image of a subject; and
a display portion displaying the image photographed by the dual camera module, wherein the dual camera module may include: a first lens driving device comprising a first housing, a first bobbin accommodated into an inside of the first housing, a first driving magnet disposed at the first housing, a first coil disposed at the first bobbin to be opposite to the first driving magnet, a first support member coupled to the first housing and the first bobbin to movably support the first bobbin along a first optical axis, a first sensing magnet disposed at the first bobbin, a first compensation magnet disposed at the first bobbin to be symmetrical with the first compensation magnet about the first optical axis, and a first Hall sensor disposed at the first housing to detect the first sensing magnet;
a second lens driving device comprising a second housing, a second bobbin accommodated into an inside of the second housing, a second driving magnet disposed at the second housing; a second coil disposed at the second bobbin to be opposite to the second driving magnet, a second support member coupled to the second housing and to the second bobbin to movably support the second bobbin along a second optical axis, a second sensing magnet disposed at the second bobbin, a second compensation magnet disposed at the second bobbin to be symmetrical with the second sensing magnet about the second optical axis, and a second Hall sensor disposed at the second housing to detect the second sensing magnet, wherein,
the first lens driving device is parallel spaced apart from the second lens driving device, the first Hall sensor is disposed at a corner portion most spaced apart from the second sensing magnet among a plurality of corner portions of the first housing, and the second Hall sensor is disposed at a corner portion most spaced apart from the first Hall sensor among a plurality of corner portions of the second housing.

Advantageous Effects

An influence of magnetic forces mutually affected by magnets of two camera modules in a dual camera module can be minimized, through which a discrete distance between two camera modules can be minimized according to the exemplary embodiments of present invention.

BEST MODE

Figure 1:
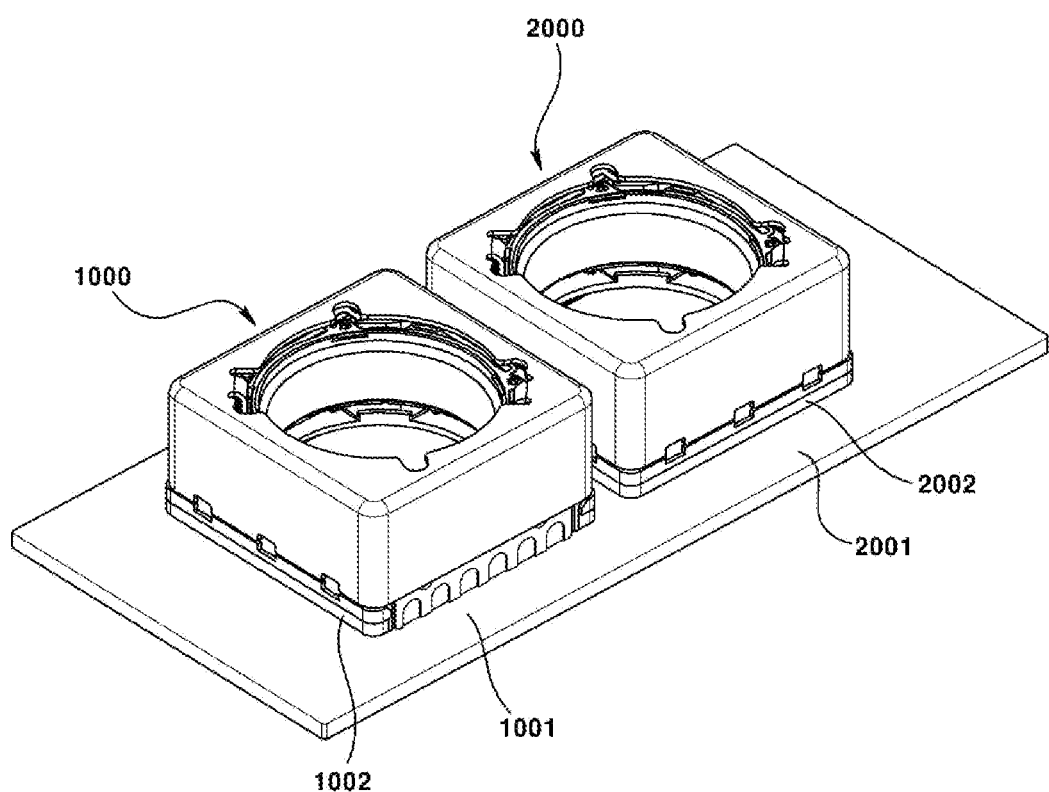
FIG. 1 is a perspective view of a dual camera module according to an exemplary embodiment of present invention.

Some exemplary embodiments of present invention will be described in detail with reference to the accompanying drawings. In describing a reference numeral for each element, a same reference numeral will be designated, if possible, for the same element, albeit being differently indicated on other drawings. Furthermore, a detailed explanation of some elements will be omitted in explaining exemplary embodiments of the present invention if obstructed in the understanding of exemplary embodiment of present invention.

In describing elements in the exemplary embodiments of the present invention, the terms, first, second, A, B (a), (b), etc., may be used. These terms may be used only to distinguish one element from another element, and the nature, order or sequence is not restricted by these terms. When an element is referred to as being "accessed to", "coupled to," or "connected to," another element, it should be appreciated that the element may be directly accessed, connected or coupled to the other element, or intervening elements may be present therebetween.

The 'auto focus function' used hereinafter may be defined as a function of adjusting a focus relative to a subject by adjusting a distance to an image sensor through movement of lens module to an optical axis direction in response to a distance to the subject, whereby a clear image of a subject can be obtained on an image sensor. Meantime, an 'auto focus' may be interchangeably used with an 'AF (Auto Focus)'.

Hereinafter, a first AF support member (1600) may be called a "first support member", and a second AF support member (2600) may be called a "second support member". Hereinafter, any one of a first Hall sensor (1430) and a second Hall sensor (2430) may be called a "first position sensor", and another one may be called a "second position sensor".

Now, configuration of optical instrument according to an exemplary embodiment will be described.

The optical instrument according to an exemplary embodiment of the present invention may be any one of a hand phone, a mobile phone, a smart phone, a portable smart device, a digital camera, a notebook computer (laptop computer), a digital broadcasting terminal, a PDA (Personal Digital Assistant), a PMP (Portable Multimedia Player) and a navigation device. However, the present invention is not limited thereto, and may comprise any device capable of photographing an image or a photograph.

The optical instrument according to an exemplary embodiment may comprise a main body (not shown), a dual camera module and a display part (not shown). However, any one or more of the elements in main body, the dual camera module and the display part may be omitted or changed from the optical instrument.

The main body may form an external shape of an optical instrument. The main body may comprise a cubic shape, for example. However, the present invention is not limited thereto. As a modification, the main body may be partially rounded. The main body may accommodate a dual camera module. One surface of a main body may be disposed with a display part.

The dual camera module may be disposed on the main body. The dual camera module may be disposed at one surface of main body. At least one portion of the dual camera module may be accommodated into the main body. The dual camera module may photograph an image of a subject.

The display part may be disposed on the main body. The display part may be disposed at one surface of main body. That is, the display part may be disposed on a same surface as that of dual camera module. Alternatively, the display part may be disposed at the other surface of main body. The display part may be disposed on a surface disposed at an opposite surface of a surface disposed with the dual camera module. The display part may output an image photographed by the dual camera module.

Hereinafter, configuration of a dual camera module according to an exemplary embodiment of the present invention will be described with reference to the accompanying drawings.

FIG. 1 is a perspective view of a dual camera module according to an exemplary embodiment of present invention.

The dual camera module according to an exemplary embodiment of present invention may comprise a first camera module and a second camera module.

The first camera module may be an AF feedback driving camera module having an AF feedback function. At this time, the first camera module may be called an "AF feedback camera module". Alternatively, the first camera module may be disposed with an AF driving camera module having an auto focus function. At this time, the first camera module may be called an "AF camera module". Alternatively, the first camera module may be formed as an OIS driving camera module.

The first camera module may comprise a first lens driving device (1000), a first lens module (not shown), a first infrared filter (not shown), a first PCB (Printed Circuit Board, 1001), a first image sensor (not shown) and a first controller (not shown). However, any one or more of the first lens driving device (1000), the first lens module, the first infrared filter, the first PCB (1001), the first image sensor and the first controller may be omitted or changed from the configuration of first camera module.

The first lens module may comprise a lens and a lens barrel. The first lens module may comprise one or more lenses (not shown) and a lens barrel accommodating one or more lenses. However, one element of the first lens module is not limited by the lens module, and any holder structure capable of supporting one or more lenses will suffice. The first lens module may move along with a first lens driving device (1000) by being coupled to the first lens driving device (1000). The first lens module may be coupled to an inside of the first lens driving device (1000). The first lens module may be screw-coupled to the first lens driving device (1000). The first lens module may be coupled with the first lens driving device (1000) by an adhesive (not shown). Meantime, a light having passed the first lens module may be irradiated on a first image sensor.

The first infrared filter may serve to inhibit a light of infrared ray region from entering the first image sensor. The first infrared filter may be interposed between the first lens module and the first image sensor. The first infrared filter may be disposed at a holder member (not shown) that is separately disposed from a first base (1500). However, the first infrared filter may be mounted on an opening (1510) formed at a center of the first base (1500). The first infrared filter may be formed with a film material or a glass material. The first infrared filter may be formed by allowing an infrared cut-off coating material to be coated on a plate-shaped optical filter such as an imaging plane protection cover glass or a cover glass. The first infrared filter may be an infrared cut-off filter or an infrared absorption filter.

The first PCB (1001) may support the first lens driving device (1000). The first PCB (1001) may be mounted with a first image sensor. For example, the first PCB (1001) may be disposed at an inner upper side with the first image sensor and may be disposed at an outer upper side with a first sensor holder (1002). An upper side of the first sensor holder (1002) may be disposed with the first lens driving device (1000). The first sensor holder (1002) may be integrally formed with the first base (1500). Alternatively, the first PCB (1001) may be disposed at an upper outer side with the first lens driving device (1000), and may be disposed at an inner upper side with the first image sensor. Through the said structure, a light having passed the first lens module accommodated at an inside of the first lens driving device (1000) may be irradiated on the first image sensor mounted on the first PCB (1001). The first PCB (1001) may supply a power to the first lens driving device (1000). Meantime, the first PCB (1001) may be disposed with a first controller in order to control the first lens driving device (1000). The first PCB (1001) may be integrally formed with a second PCB (2001). The first and/or second PCBs (1001, 2001) may be a substrate of an optical instrument. Each of the first and second PCBs (1001, 2001) may comprise a terminal in order to be connected to an outside.

The first image sensor may be mounted on the first PCB (1001). The first image sensor may be so disposed as to match the first lens module by way of optical axis, through which the first image sensor can obtain a light having passed the first lens module. The first image sensor may output the irradiated light in an image. The first image sensor may be, for example, a CCD (charge coupled device), a MOS (metal oxide semi-conductor), a CPD and a CID. However, the types of first image sensors are not limited thereto.

The first controller may be mounted on the first PCB (1001). The first controller may be disposed at an outside of the first lens driving device (1000). However, the first controller may be disposed at an inside of the first lens driving device (1000), though. The first controller may control a direction, intensity and an amplitude of a current supplied to each element forming the first lens driving device (1000). The first controller may perform an auto focus function of the first camera module by controlling the first lens driving device (1000). That is, the first controller may move the first lens module to an optical axis direction by controlling the first lens driving device (1000). Furthermore, the first controller may perform a feedback control of auto focus function. To be more specific, the first controller may provide a more accurate auto focus function by controlling a current or a power supplied to a first coil (1220) by receiving a position of the first bobbin (1220) detected by a first Hall sensor (1430). The first controller may perform feedback control of an auto focus function and an OIS function.

Hereinafter, configuration of first lens driving device will be described with reference to the accompanying drawings.

Figure 2:
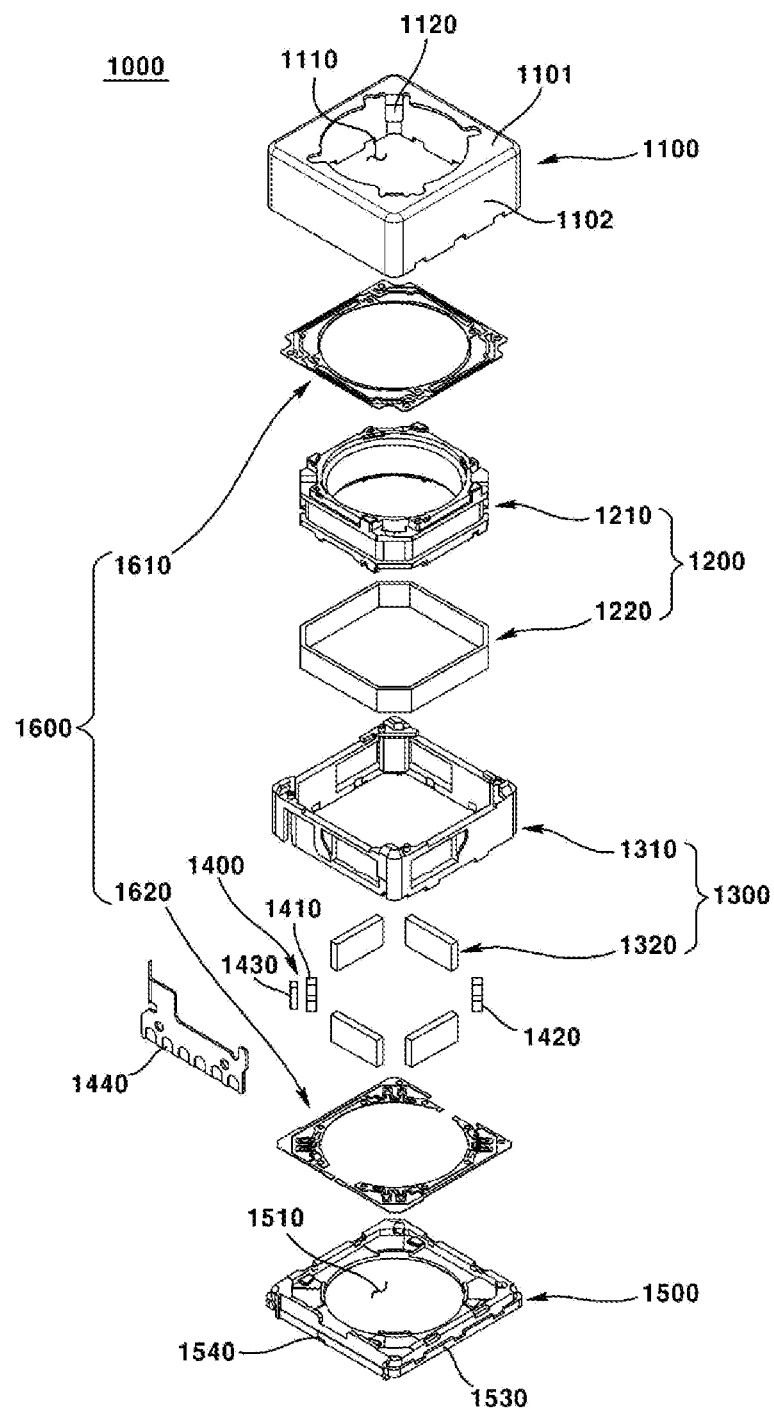
FIG. 2 is an exploded perspective view of a first lens driving device according to an exemplary embodiment of present invention.
Figure 3:
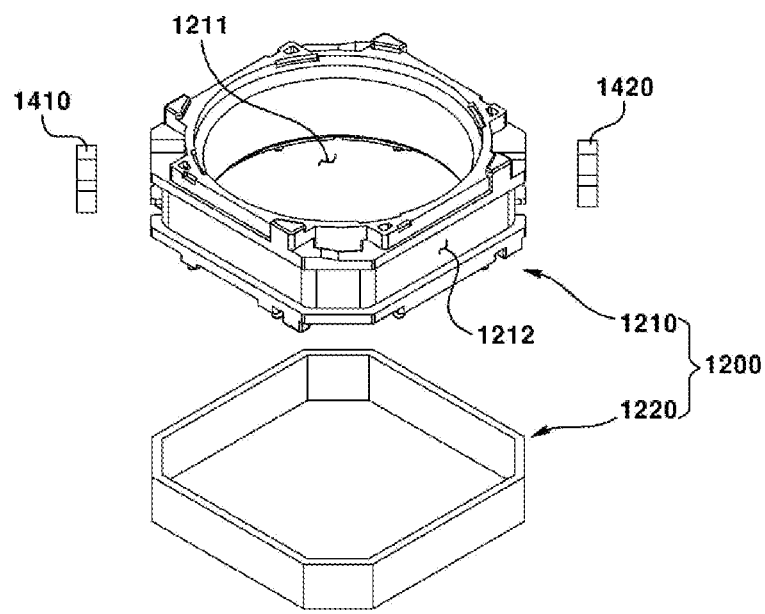
FIG. 3 is an exploded perspective view of a first mover of a first lens driving device according to an exemplary embodiment of present invention.
Figure 4:
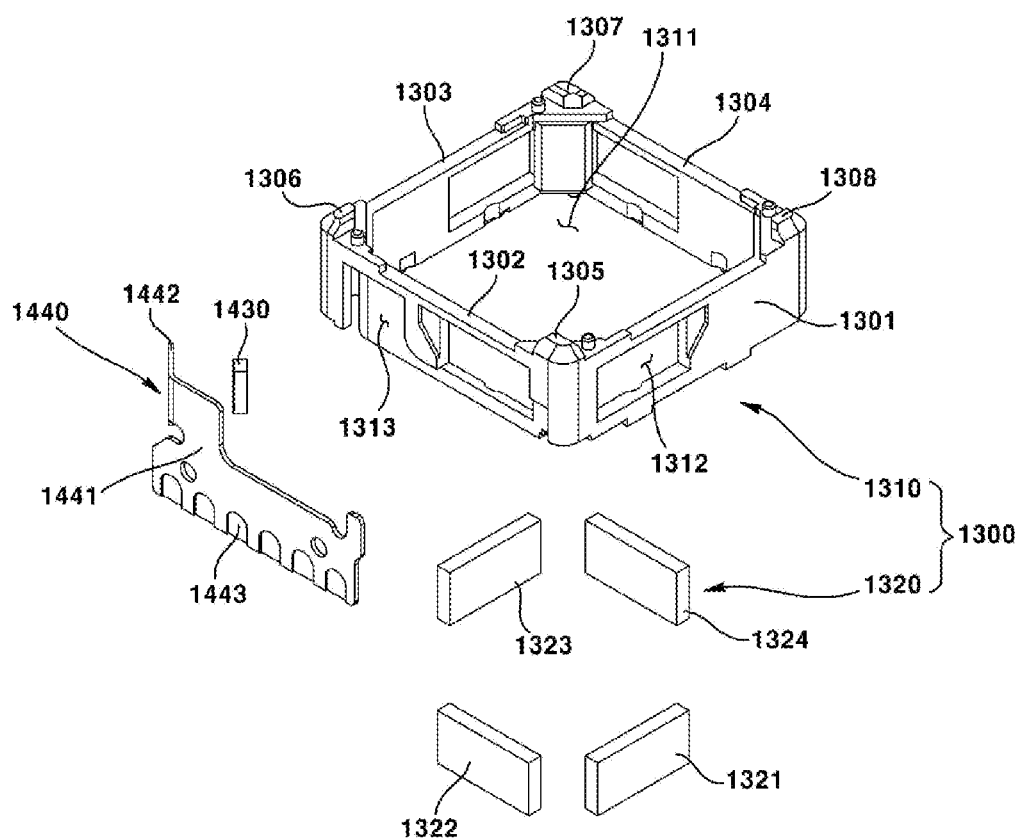
FIG. 4 is an exploded perspective view of some elements at a first stator of first lens driving device and a first AF feedback sensor unit according to an exemplary embodiment of present invention.
Figure 5:
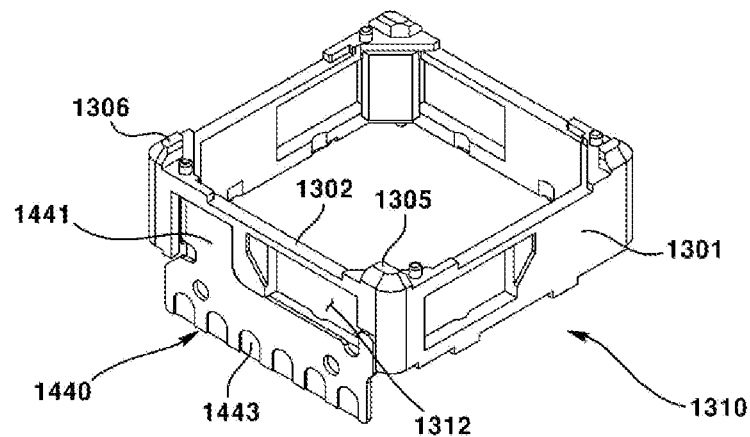
FIG. 5 is a perspective view of a coupled state between a first housing and a first substrate of first lens driving device according to an exemplary embodiment of present invention.
Figure 6:
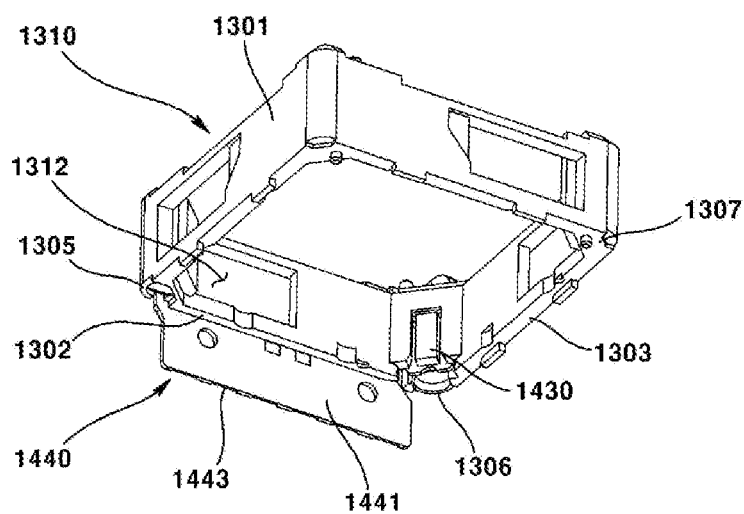
FIG. 6 is a bottom perspective view of a coupled state of a first housing, a first substrate and a first Hall sensor at a first lens driving device according to an exemplary embodiment of present invention.
Figure 7:
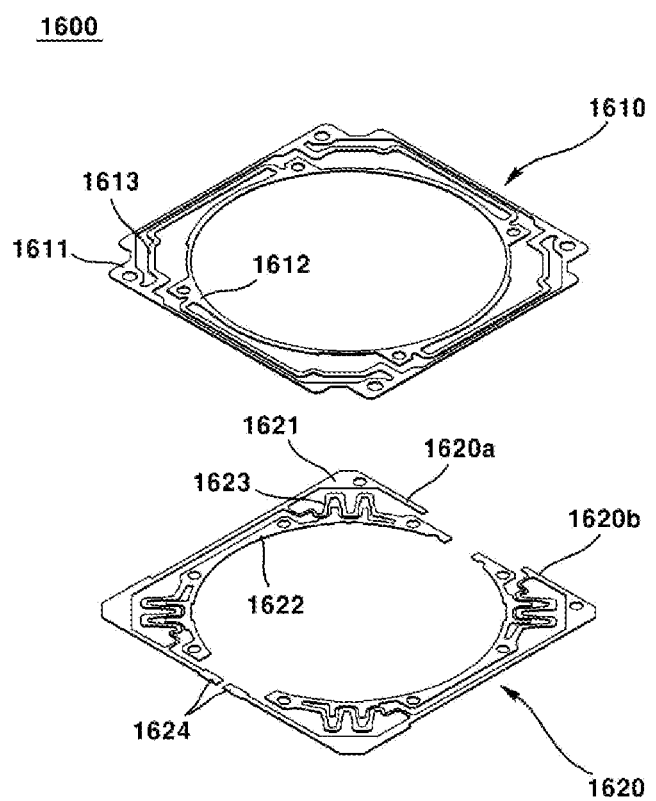
FIG. 7 is an exploded perspective view of a first AF support member of first lens driving device according to an exemplary embodiment of present invention.

FIG. 2 is an exploded perspective view of a first lens driving device according to an exemplary embodiment of present invention, FIG. 3 is an exploded perspective view of a first mover of a first lens driving device according to an exemplary embodiment of present invention, FIG. 4 is an exploded perspective view of some elements at a first stator of first lens driving device and a first AF feedback sensor unit according to an exemplary embodiment of present invention, FIG. 5 is a perspective view of a coupled state between a first housing and a first substrate of first lens driving device according to an exemplary embodiment of present invention, FIG. 6 is a bottom perspective view of a coupled state of a first housing, a first substrate and a first Hall sensor at a first lens driving device according to an exemplary embodiment of present invention and FIG. 7 is an exploded perspective view of a first AF support member of first lens driving device according to an exemplary embodiment of present invention.

The first lens driving device (1000) may be spaced apart from the second lens driving device (2000). The first lens driving device (1000) may be aligned with the second lens driving device (2000). The first lens driving device (1000) may be parallel with the second lens driving device (2000). The first lens driving device (1000) may be so disposed as to allow a surface facing the second lens driving device (2000) to be parallel. A first lateral surface (1301) of first lens driving device (1000) may be disposed in parallel with a fifth lateral surface (2301) of the second lens driving device (2000). The first lateral surface (1301) of first lens driving device (1000) may be overlapped with the fifth lateral surface (2301) of second lens driving device (2000) to a direction perpendicular to a first optical axis. A first cover member (1100) of first lens driving device (1000) may be spaced apart by 1 mm~5 mm from a second cover member (2100) of second lens driving device (2000). That is, a discrete distance (see L of FIG. 14) between the first cover member (1100) and the second cover member (2100) may be 1 mm~5 mm. Alternatively, a discrete distance (L) between the first cover member (1100) and the second cover member (2100) may be 1 mm~3 mm. Alternatively, a discrete distance (L) between the first cover member (1100) and the second cover member (2100) may be 1 mm.

The first lens driving device (1000) may comprise a first cover member (1100), a first mover (1200), a first stator (1300), a first AF feedback sensor unit (1400), a first base (1500) and a first AF support member (1600). However, any one or more of the first cover member (1100), the first mover (1200), a first stator (1300), a first AF feedback sensor unit (1400), a first base (1500) and a first AF support member (1600) may be omitted or changed from the first lens driving device (1000). Particularly, the first AF feedback sensor unit (1400) may be changed or omitted from a first modification and a second modification.

The first cover member (1100) may accommodate a first housing (1310) at an inside thereof. The first cover member (1100) may be integrally formed with the first housing (1310). Alternatively, the first cover member (1100) may be omitted and the first housing (1310) may function as the first cover member (1100). That is, the first cover member (1100) may be the first housing (1310).

The first cover member (1100) may form an exterior shape of the first lens driving device (1000). The first cover member (1100) may take a bottom-opened cubic shape. However, the present invention is not limited thereto. The first cover member (1100) may comprise a non-magnetic substance. If the first cover member (1100) is formed with a magnetic substance, a magnetic force of the first cover member (1100) may be affected to a second sensing magnet (2420) and/or a second compensation magnet (2320). The first cover member (1100) may be formed with a metal material. To be more specific, the first cover member (1100) may be formed with a metal plate. In this case, the first cover member (1100) can shield an EMI (Electro Magnetic Interference). Because of the said characteristics of the first cover member (1100), the first cover member (1100) may be called an "EMI shield can". The first cover member (1100) may shield the electromagnetic waves generated from an outside of the first lens driving device (1000) from entering into the first cover member (1100). Furthermore, the first cover member (1100) may inhibit the electromagnetic waves generated from inside of the first cover member (1100) from being emitted to an outside of the first cover member (1100). However, the material of the first cover member (1100) is not limited thereto.

The first cover member (1100) may comprise an upper plate (1101) and a side plate (1102). The first cover member (1100) may comprise an upper plate (1101) and a side plate (1102) extended from an outside of upper plate (1101) to a lower side. A lower end of the side plate (1102) may be mounted on the first base (1500). A lower end of the side plate (1102) at the first cover member (1100) may be coupled to a staircase part (1540) of the first base (1500). The first cover member (1100) may be adhered to a whole part or to a portion of a side of the first base (1500) to be mounted on the first base (1500). An inner space formed by the first cover member (1100) and the first base (1500) may be disposed with the first mover (1200), the first stator (1300) and the first AF support member (1600). Through this structure, the first cover member (1100) can protect inner elements from the outside shocks and simultaneously inhibit outside foreign objects from entering. However, the present invention is not limited thereto, and the lower end of the side plate (1102) at the first cover member (1100) may be directly coupled to the first PCB (1001) disposed at a lower side of first base (1500). Some elements in a plurality of side plates (1102) may face a second cover member (2100).

The first cover member (1100) may comprise an opening (1110) and an extension (1120). However, the extension part (1120) may be omitted or changed from the first cover member (1100).

The opening (1110) may be formed at an upper plate (1101). The opening (1110) may expose the first lens module. The opening (1110) may be formed with a shape corresponding to that of the first lens module. The opening (1110) may be formed to be larger in size than a diameter of the first lens module to allow the first lens module to be assembled through the opening (1110). Meantime, a light introduced into through the opening (1110) may pass through the first lens module. At this time, the light having passed the first lens module may be obtained by the first image sensor as an image.

The extension part (1120) may be formed by being bent from an inside surface of the upper plate (1101) to a lower side. The extension part (1120) may be called an "inner yoke". At least one portion of extension part (1120) may be inserted into a groove formed on a first bobbin (1210). Through this structure, the first bobbin (1210) may be inhibited from a phenomenon of the first bobbin (1210) being rotated in the screw-coupling process of the first lens module to the first bobbin (1210). Even in other situations, the extension part (1120) can inhibit the first bobbin (1210) from rotating relative to the first cover member (1100).

The first mover (1200) may be coupled with the first lens module. The first mover (1200) may accommodate the first lens module into an inside thereof. An inside surface of the first mover (1200) may be coupled with an outside surface of first lens module. The first mover (1200) may move integrally with the first lens module through an electromagnetic interaction with the first stator (1300). The first mover (1200) may comprise a first bobbin (1210) and a first coil (1220). However, any one or more of the first bobbin (1210) and the first coil (1220) may be omitted or changed.

The first bobbin (1210) may be disposed at an inside of a first housing (1310). The first bobbin (1210) may be accommodated into a through hole (1311) of the first housing (1310). The first bobbin (1210) may be coupled with the first lens module. To be more specific, an inside surface of first bobbin (1210) may be coupled with an outside surface of first lens module. The first bobbin (1210) may be coupled with the first coil (1220). A lower surface of first bobbin (1210) may be coupled with a first lower support member (1620). An upper surface of first bobbin (1210) may be coupled with a first upper support member (1610). The first bobbin (1210) may move to an optical axis direction relative to the first housing (1310).

The first bobbin (1210) may comprise a through hole (1211) and a coil reception part (1212). However, any one or more of the through hole (1211) and the coil reception part (1212) may be omitted or changed from the first bobbin (1210).

The through hole (1211) may be formed at an inside of the first bobbin (1210). The through hole (1211) may be formed with upper/lower sides-opened shape. The through hole (1211) may be coupled with the first lens module. The through hole (1211) may be formed at an inside surface with a screw thread of a shape corresponding to that formed at an outside of the first lens module. That is, the through hole (1211) may be screw-coupled with the first lens module. An adhesive may be interposed between the first lens module and the first bobbin (1210). At this time, the adhesive may be an epoxy hardened by heat, UV or laser. That is, the first lens module and the first bobbin (1210) may be coupled by a UV-hardening epoxy and/or heat-hardening epoxy.

The coil reception part (1212) may accommodate at least one portion of the first coil (1220). The coil reception part (1212) may be integrally formed with an outside surface of first bobbin (1210). Furthermore, the coil reception part (1212) may be continuously formed along an outside surface of first bobbin (1210) or may be spaced apart from the outside surface of first bobbin (1210) at a predetermined gap. For example, the coil reception part (1212) may be formed by allowing a portion of the outside surface of the first bobbin (1210) to be recessed in a shape corresponding to that of the first coil (1220). At this time, the first coil (1220) may be directly wound on a first driving part coupling part (1212). As a modification, the coil reception part (1212) may be formed by allowing an upper side or a lower side to be opened. At this time, the first coil (1220) may be inserted into and coupled with the coil reception part (1212) through the opened portion while being in a pre-wound state.

The first coil (1220) may be disposed at the first bobbin (1210). The first coil (1220) may be disposed at an outside surface of the first bobbin (1210). The first coil (1220) may be directly wound on an outside surface of first bobbin (1210). The first coil (1220) may mutually and electromagnetically interact with the first driving magnet (1320).

The first coil (1220) may face the first driving magnet (1320). In this case, when a current is supplied to the first coil (1220) to allow forming a magnetic field about the first coil (1220), the first coil (1220) may move relative to the first driving magnet (1320) in response to the electromagnetic interaction between the first coil (1220) and the first driving magnet (1320). The first coil (1220) may move for AF driving. In this case, the first coil (1220) may be called an "AF coil".

The first coil (1220) may comprise a pair of lead cables (not shown) for power supply. The pair of lead cables at the first coil (1220) may be electrically connected to the first lower support member (1620). Each of the lead cables of the first coil (1220) may be respectively connected to first and second support units (1620a, 1620b). In this case, an electric power may be supplied to the first coil (1220) through the first lower support member (1620) electrically connected to the first PCB (1001) through a terminal part (1624).

The first stator (1300) may accommodate the first mover (1200) at an inside thereof. The first stator (1300), as a fixed member, may move the first mover (1200) through an electromagnetic interaction. The first stator (1300) may comprise a first housing (1310) and a first driving magnet (1320). However, any one or more of the first housing (1310) and the first driving magnet (1320) may be omitted or changed from the first stator (1300).

The first housing (1310) may be disposed at an outside of the first bobbin (1210). The housing (1310) may be spaced apart from the first bobbin (1210). At least one portion of the first housing (1310) may be formed with a shape corresponding to that of an inside surface of the first cover member (1100).

Particularly, an outside surface of the first housing (1310) may be formed with a shape corresponding to that of an inside surface of lateral plate (1102) of the first cover member (1100). The first housing (1310) may take a cubic shape comprising four side surfaces, for example. However, the shape of first housing (1310) may be formed with any shape as long as the first housing (1310) can be disposed inside the first cover member (1100). The first housing (1310) may be formed with an injection in consideration of productivity. The first housing (1310) may be fixed on the first base (1500). The first housing (1310) may be omitted and the first magnet unit (1320) may be fixed to the first cover member (1100), as a modification. An upper surface of first housing (1310) may be coupled with a first upper support member (1610). The first housing (1310) may be coupled at a lower side with a first lower support member (1620).

The first housing (1310) may comprise first to fourth side surfaces (1301, 1302, 1303, 1304). The first housing (1310) may comprise continuously disposed first to fourth side surfaces (1301, 1302, 1303, 1304). The first housing (1310) may comprise a first side surface (1301) disposed with a first magnet (1321), a second side surface (1302) disposed with a second magnet (1322), a third side surface (1303) disposed with a third magnet (1323) and a fourth side surface (1304) disposed with a fourth magnet (1324). The first side surface (1301) of the first housing (1310) of the first lens driving device (1000) may face a fifth side surface (2301) of second housing (2310) of the second lens driving device (2000). The first housing (1310) may comprise a first side surface (1301), a third side surface (1303) disposed opposite to the first side surface (1301), and second and fourth side surfaces (1302, 1304) mutually oppositely disposed between the first and third side surfaces (1301, 1303).

The first housing (1310) may comprise first to fourth corner portions (1305, 1306, 1307, 1308). The first housing (1310) may comprise first to fourth corner portions (1305, 1306, 1307, 1308) disposed among first to fourth side surfaces (1301, 1302, 1303, 1304). The first corner portion (1305) may be interposed between first and second side surfaces (1301, 1302). The second corner portion (1306) may be interposed between second and third side surfaces (1302, 1303). The third corner portion (1307) may be interposed between third and fourth side surfaces (1303, 1304). The fourth corner portion (1308) may be interposed between the fourth and first side surfaces (1304, 1301).

The first housing (1310) may comprise a through hole (1311), a magnet reception part (1312), a sensor reception part (1313). However, any one or more of the through hole (1311), the magnet reception part (1312) and the sensor reception part (1313) may be omitted or changed from the first housing (1310).

The through hole (1311) may be formed at an inside of the first housing (1310). The through hole (1311) may be opened at an upper side and a lower side. The through hole (1311) may be accommodated with the first bobbin (1210). The through hole (1311) may be movably disposed with the first bobbin (1210). The through hole (1310) may be formed with a shape corresponding to that of the first bobbin (1210).

The magnet reception part (1312) may be formed at a side surface of the first housing (1310). The magnet reception part (1312) may be formed with a hole through which the first housing (1310) can pass. Alternatively, the magnet reception part (1312) may be formed with a hole formed by allowing a portion of the first housing (1310) to be recessed. The magnet reception part (1312) may accommodate at least a portion of the first magnet unit (1320). An adhesive (not shown) may be interposed between the first magnet unit (1320) and the magnet reception part (1312). That is, the first magnet unit (1320) and the magnet reception part (1312) may be coupled by an adhesive. The magnet reception part (1312) may be disposed at an inside surface of first housing (1310). The magnet reception part (1312) may be formed by allowing a portion of an inside of the first housing (1310) to be outwardly recessed. In this case, the electromagnetic interaction with the first coil (1220) disposed at an inside of the first magnet unit (1320) may be advantageously implemented.

The sensor reception part (1313) may be formed at the first housing (1310). The sensor reception part (1313) may be formed at the second side surface (1302) of first housing (1310). The sensor reception part (1313) may be formed at an outside of the first housing (1310). The sensor reception part (1313) may be formed at an outside of the first housing (1310) by being recessed inwardly. The sensor reception part (1313) may accommodate at least a portion of the first Hall sensor (1430) and at least a portion of the first substrate (1440). The sensor reception part (1313) may be formed with a shape corresponding to that of the first Hall sensor (1430) and to that of the first substrate (1440).

The first driving magnet (1320) may be disposed at the first housing (1310). The first driving magnet (1320) may be arranged at the first housing (1310). The first driving magnet (1320) may be accommodated into the magnet reception part (1312) of first housing (1310). The first driving magnet (1320) may electromagnetically interact with the first coil (1220). The first driving magnet (1320) may face the first coil (1220). The first driving magnet (1320) may move the first bobbin (1210) fixed at the first coil (1220). The first driving magnet (1320) may move the first coil (1220) for AF driving. In this case, the first driving magnet (1320) may be called an "AF magnet".

The first driving magnet (1320) may comprise first to fourth magnets (1321, 1322, 1323, 1324). The first driving magnet (1320) may comprise the first to fourth magnets (1321, 1322, 1323, 1324), each spaced apart from the other. The first driving magnet (1320) may comprise the first to fourth magnets (1321, 1322, 1323, 1324) respectively disposed on the first to fourth side surfaces (1301, 1302, 1303, 1304) of the first housing (1310). The first driving magnet (1320) may comprise a first magnet (1321) disposed at the first side surface (1301) of first housing (1310). The first driving magnet (1320) may comprise a second magnet (1322) disposed at the second side surface (1302) of first housing (1310). The first driving magnet (1320) may comprise a third magnet (1323) disposed at the third side surface (1303) of first housing (1310). The first driving magnet (1320) may comprise a fourth magnet (1324) disposed at the fourth side surface (1304) of first housing (1310).

The first magnet (1321) may be disposed at the first side surface (1301) of first housing (1310). The first magnet (1321) may be disposed closer to the first corner portion (1305) than to the fourth corner portion (1308). The second magnet (1322) may be disposed at the second side surface (1302) of first housing (1310). The second magnet (1322) may be disposed closer to the first corner portion (1305) than to the second corner portion (1306). The third magnet (1323) may be disposed at the third side surface (1303) of first housing (1310). The third magnet (1323) may be disposed closer to the third corner portion (1307) than to the second corner portion (1306). The fourth magnet (1324) may be disposed at the fourth side surface (1304) of first housing (1310). The fourth magnet (1324) may be disposed closer to the third corner portion (1307) than to the fourth corner portion (1308).

The first to fourth magnets (1321, 1322, 1323, 1324) may be mutually symmetrical based on a first optical axis. The first magnet (1321) may be symmetrical with the third magnet (1323) based on the first optical axis. The first magnet (1321) may be disposed at a position symmetrical with the third magnet (1323) based on the first optical axis. The first magnet (1321) may be disposed with a size and a shape corresponding to the third magnet (1323) about a first optical axis. The second magnet (1322) may be symmetrical with the fourth magnet (1324) about the first optical axis. The second magnet (1322) may be disposed at a position symmetrical with the fourth magnet (1324) based on the first optical axis. The second magnet (1322) may be disposed with a size and a shape corresponding to the fourth magnet (1324) about a first optical axis.

Each of the first to fourth magnets (1321, 1322, 1323, 1324) may take a flat plate shape. In this case, Each of the first to fourth magnets (1321, 1322, 1323, 1324) may be called a "flat plate magnet". Each N pole of the first to fourth magnets (1321, 1322, 1323, 1324) may be so disposed as to face an inside. Each S pole of the first to fourth magnets (1321, 1322, 1323, 1324) may be so disposed as to face an inside.

The first to fourth magnets (1321, 1322, 1323, 1324) may be symmetrical with fifth to eighth magnets (2321, 2322, 2323, 2324) about a first virtual line which is an imaginary straight line. The first virtual line may be disposed on a plane surface comprising the first and second optical axes, and may be parallel with the first and second optical axes. Furthermore, the first virtual line may be equidistantly spaced apart from the first and second optical axes.

The first magnet (1321) may not be overlapped with the fifth magnet to a direction perpendicular to the first optical axis. The first magnet (1321) may be overlapped within a 30% area facing the fifth magnet (2321) to a direction perpendicular to the first optical axis. Alternatively, the first magnet (1321) may be overlapped within a 50% area facing the fifth magnet (2321) to a direction perpendicular to the first optical axis.

The first driving magnet (1320) may be formed with a shape corresponding to that of the second driving magnet (2320). The first driving magnet (1320) may have a same width as that of the second driving magnet (2320). The first driving magnet (1320) may have a same height as that of the second driving magnet (2320). The first driving magnet (1320) may have a same thickness as that of the second driving magnet (2320). A position disposed with the first driving magnet (1320) at the first lens driving device (1000) may correspond to a position disposed with the second driving magnet (2320) at the second lens driving device (2000). The first coil (1220) may have eight side surfaces, and the first driving magnet (1320) may be so disposed as to face any one side surfaces of the eight side surfaces of first coil (1220). A length of first driving magnet (1320) may be shorter than a length of a surface facing the first coil (1220). The first coil (1220) may have eight side surfaces, and the first sensing magnet (1410) may be so disposed as to face any one side surface of the eight side surfaces of first coil (1220). The first coil (1220) may have eight side surfaces, and the first compensation magnet (1420) may be so disposed as to face any one side surface of eight side surfaces of first coil (1220).

The first AF feedback sensor unit (1400) may provide position information of a lens module by detecting the position information of lens module for auto focus function.

The first AF feedback sensor unit (1400) may comprise a first sensing magnet (1410), a first Hall sensor (1430) and a first substrate (1440). However, any one or more of the first sensing magnet (1410), the first Hall sensor (1430) and the first substrate (1440) may be omitted or changed from the first AF feedback sensor unit (1400).

The first compensation magnet (1420) may be appreciated as a member included in the first AF feedback sensor unit (1400) and may be a member disposed for magnetic balance with the first sensing magnet (1410). Alternatively, the first compensation magnet (1420) may be appreciated as a member separate from the first AF feedback sensor unit (1400).

The first sensing magnet (1410) may be disposed on the first bobbin (1210). The first sensing magnet (1410) may be arranged on the first bobbin (1210). The first sensing magnet (1410) may be detected by the first Hall sensor (1430). The first sensing magnet (1410) may be disposed at a corner of the first bobbin (1210). The first sensing magnet (1410) may be so disposed as to face a second corner portion (1306) of first housing (1310). The first sensing magnet (1410) may be disposed on a virtual straight line connecting the second corner portion (1306) and the fourth corner portion (1308).

The first sensing magnet (1410) may be symmetrical with the first compensation magnet (1420) about the first bobbin (1210). The first sensing magnet (1410) may have a magnetism corresponding to that of the first compensation magnet (1420). The first sensing magnet (1410) may be disposed at one side of first bobbin (1210). The first sensing magnet (1410) may be overlapped with the first coil (1220) to a direction perpendicular to the first optical axis.

The first sensing magnet (1410) may be disposed at an inside of the first coil (1220). The first coil (1220) may comprise eight side surfaces, and the first sensing magnet (1410) may be so disposed as to be arranged at an inside of the first coil in order to face any one side surface of eight side surfaces of first coil (1220). The first sensing magnet (1410) may be disposed at an outside of first coil (1220). The first sensing magnet (1410) may be interposed between the first Hall sensor (1430) and the first coil (1220). In this case, a detected value detected by the first Hall sensor (1430) may be increased because a distance between the first sensing magnet (1410) and the first Hall sensor (1430) is shortened when compared with a case where the first sensing magnet (1410) is disposed at an inside of the first coil (1220). The first sensing magnet (1410) may be magnetized at four poles and may be disposed in consideration of a relative position with the first Hall sensor (1430) to allow using only a section where a Hall output is a positive number. The first sensing magnet (1410) may be so disposed as to allow an S pole to be formed at an inner upper side, to allow an N pole to be formed at an upper outside, to allow an N pole to be formed at a lower inner side, and to allow an S pole to be formed at a lower outer side.

The first compensation magnet (1420) may be disposed form a magnetic force balance with the first sensing magnet (1410). The first compensation magnet (1420) may be disposed at the first bobbin (1210). The first compensation magnet (1420) may be arranged on the first bobbin (1210). The first compensation magnet (1420) may be symmetrical with the first sensing magnet (1410) about the first optical axis. The first compensation magnet (1420) may be symmetrical with the first sensing magnet (1410) about the first bobbin (1210). The first compensation magnet (1420) may have a magnetism corresponding to that of the first sensing magnet (1410). The first compensation magnet (1420) may be disposed at the other side corresponding to an opposite side of one side of first bobbin (1210) disposed with the first sensing magnet (1410). The first compensation magnet (1420) may be disposed on a virtual straight line connecting the second corner portion (1306) and the fourth corner portion (1308). The first compensation magnet (1420) may be symmetrically disposed with the first sensing magnet (1410) about the first optical axis. Through this configuration, an electromagnetic balance between the first sensing magnet (1410) and the first compensation magnet (1420) may be realized. As a result, the first sensing magnet (1410) can minimize an influence affected on the electromagnetic interaction between the first coil (1220) and the first driving magnet (1320).

The first compensation magnet (1420) may be disposed at an inside of first coil (1220). The first coil (1220) may comprise eight side surfaces, and the first compensation magnet (1420) may be disposed at an inside of the first coil (1220) to allow facing any one side surface of the eight side surfaces of first coil (1220). The first compensation magnet (1420) may be disposed at an outside of first coil (1220).

The Hall sensor (1430) may be disposed at the first housing (1310). The first Hall sensor (1430) may be arranged on the first housing (1310). The first Hall sensor (1430) may be disposed at a corner portion of first housing (1310). The Hall sensor (1430) may be disposed at a corner portion most spaced apart from the second sensing magnet (2410) among a plurality of corner portions of first housing (1310). The first Hall sensor (1430) may be disposed at a corner portion most spaced apart from the second Hall sensor (2430) among a plurality of corner portions of first housing (1310). Through this configuration, the first Hall sensor (1430) and the second Hall sensor (2430) may be maximally spaced apart within a limited space. The first Hall sensor (1430) may be disposed at the second corner portion (1306) of first housing (1310). The first Hall sensor (1430) may be interposed between the second and third side surfaces (1302, 1303). The first Hall sensor (1430) may be disposed on a virtual straight line connecting the second corner portion (1306) and the fourth corner portion (1308). That is, all the first Hall sensor (1430), the first sensing magnet (1410) and the first compensation magnet (1420) may be disposed on a virtual straight line connecting the second corner portion (1306) of first housing (1310) and the fourth corner portion (1306).

The first Hall sensor (1430) may be disposed at the first substrate (1440). The first Hall sensor (1430) may be coupled with the first substrate (1440). The first Hall sensor (1430) may be electrically connected to the first substrate (1440). The first Hall sensor (1430) may be mounted on the first substrate (1440). The first Hall sensor (1430) may be coupled to the first substrate (1440) by way of SMT (Surface Mounter Technology). the first Hall sensor (1430) may be mounted on a sensor mounting part (1442) of first substrate (1440). The first Hall sensor (1430) may detect the first sensing magnet (1410). The first Hall sensor (1430) may comprise a Hall IC detecting a magnetic field of a magnet. The first Hall sensor (1430) may comprise a Hall-integrated driver. The first Hall sensor (1430) may comprise a temperature detection function.

The first Hall sensor (1430) may be fixed to the first housing (1310) and the first sensing magnet (1410) may be fixed to the first bobbin (1210). When the first sensing magnet (1410) is moved along with the first bobbin (1210), a magnetic flux density detecting a Hall IC inside the first Hall sensor (1430) can be changed in response to a relative position between the first Hall sensor (1430) and the first sending magnet (1410).

The first Hall sensor (1430) may detect a position of first lens module using an output voltage of Hall IC that is proportionate to a magnetic flux density changing in response to a relative position between the first Hall sensor (1430) and the first sensing magnet (1410).

The first substrate (1440) may be disposed on the first housing (1310). The first substrate (1440) may be coupled by the first Hall sensor (1430). The first substrate (1440) may be mounted with the first Hall sensor (1430). The first substrate (1440) may be so formed as to be disposed at a lateral surface of one side of the first housing (1310). The first substrate (1440) may be so formed as to allow the first Hall sensor (1430) mounted on the first substrate (1440) to be disposed at a corner of the first housing (1310). At least one portion of the first substrate (1440) may be accommodated into the sensor reception part (1313) formed on the first housing (1310). The first substrate (1440) may be fixed by an adhesive while being inserted into the sensor reception part (1313) of first housing (1310). The first substrate (1440) may be configured in such a manner that a body part (1441) is disposed at an outside of first housing (1310) while being inserted into the sensor reception part (1313) of first housing (1310), and the sensor mounting part (1442) may be disposed at an inside of first housing (1310). Through this configuration, a staircase part (1443) disposed at a lower side of body part (1441) may be eased to be coupled with an outside element for electrical conductivity, and the first Hall sensor (1430) mounted on an inside of the sensor mounting part (1442) can detect the inside-disposed first sensing magnet (1410) at a high output. A portion of first substrate (1440) may be extended along a lateral surface of one side of first base (1500). The first substrate (1440) may be an FPCB (Flexible Printed Circuit Board). However, the present invention is not limited thereto. The first substrate (1440) may be electrically connected to a first lower support member (1620). The first substrate (1440) may be coupled to a staircase part (1624) of first lower support member (1620).

The first substrate (1440) may comprise a body part (1441), a sensor mounting part (1442) and a terminal part (1443). However, any one or more of the body part (1441), the sensor mounting part (1442) and the terminal part (1443) may be omitted or changed from the first substrate (1440).

The body part (1441) may be accommodated into the sensor reception part (1313) of first housing (1310). The body part (1441) may not be overlapped with the second magnet (1322) of first driving magnet (1320) to a direction perpendicular to the first optical axis of second magnet (1322). A lateral surface at one side of body part (1441) may be extended by the sensor mounting part (1442). An inner surface3 of body part (1441) may be coupled by an outer surface of first housing (1310) by an adhesive.

The sensor mounting part (1442) may be extended from a lateral surface of one side of body part (1441). The sensor mounting part (1442) may be coupled by a first Hall sensor (1430). The sensor mounting part (1442) may be mounted with the first Hall sensor (1430). The sensor mounting part (1442) may be bent from the body part (1441). The sensor mounting part (1442) may be accommodated into the sensor reception part (1313) of first housing (1310).

The terminal part (1443) may be downwardly extended from the body part (1441). The terminal part (1443) may be downwardly extended from a center of one lateral surface of one side of the first housing (1310). The terminal part (1443) may be exposed to an outside. At least one portion of terminal part (1443) may be more downwardly protruded than the first cover member (1100). The terminal part (1443) of first substrate (1440) may be coupled to a terminal part (1624) of first lower support member (620) by way of soldering. The terminal part (1443) may be electrically connected to the first PCB (1001). The terminal part (1443) may be coupled to the first PCB (1001) by way of soldering.

The first base (1500) may be disposed at a lower side of first housing (1310). The first base (1500) may be disposed at an upper surface of first PCB (1001). The first base (1500) may be coupled by a first infrared filter.

The first base (1500) may comprise an opening (1510), a terminal reception groove (1520) and a staircase part (1530). However, any one or more of the opening (1510), the terminal reception groove (1520) and the staircase part (1530) may be omitted or changed from the first base (1500).

The opening (1510) may be formed at a center of first base (1500). The opening (1510) may be so formed as to vertically penetrate the first base (1500). The opening (1510) may be overlapped with the first lens module to an optical axis direction. The opening (1510) may pass through a light having passed the first lens module.

The terminal reception groove (1520) may be formed at a lateral surface of first base (1500). The terminal reception groove (1520) may be formed by allowing a portion of lateral surface of outside at the first base (1500) to be inwardly recessed. The terminal reception groove (1520) may accommodate at least one portion of terminal part (1443) at the first substrate (1440). The terminal reception groove (1520) may be formed with a width corresponding to that of the terminal part (1443).

The staircase part (1530) may be formed at a lower end of outside at the first base (1500). The staircase part (1530) may be so formed as to be outwardly protruded from an outer surface of first base (1500). The staircase part (1530) may support a lower end of side plate (1102) of first cover member (1100).

The first AF support member (1600) may be coupled to the first bobbin (1210) and to the first housing (1310). The first AF support member (1600) may movably support the first bobbin (1210) along a first optical axis. The first AF support member (1600) may elastically support the first bobbin (1210). The first AF support member (1600) may movably support the first bobbin (1210) relative to the first housing (1310). At least one portion of first AF support member (1600) may have elasticity.

The first AF support member (1600) may comprise a first upper support member (1610) and a first lower support member (1620). However, any one or more of the first upper support member (1610) and the first lower support member (1620) may be omitted or changed from the first AF support member (1600).

The first upper support member (1610) may be coupled to an upper surface of first bobbin (1210) and to an upper surface of first housing (1310). The first upper support member (1610) may be integrally formed.

The first upper support member (1610) may comprise an external part (1611), an internal part (1612) and a connection part (1613). However, any one or more of the external part (1611), the internal part (1612) and the connection part (1613) may be omitted or changed from the first upper support member (1610).

The external part (1611) may be coupled to the first housing (1310). The external part (1611) may be coupled to an upper surface of first housing (1310).

The internal part (1612) may be coupled to the first bobbin (1210). The internal part (1612) may be coupled to an upper surface of first bobbin (1210).

The connection part (1613) may connect the external part (1611) and the internal part (1612). The connection part (1613) may elastically connect the external part (1611) and the internal part (1612). The connection part (1613) may possess elasticity.

The first lower support member (1620) may be coupled to a lower surface of first bobbin (1210) and to a lower surface of first housing (1310). The first upper support member (1610) may be electrically connected to the first coil (1220). The first lower support member (1620) may comprise first and second support units (1620a, 1620b). The first and second support units (1620a, 1620b) may respectively be coupled to a pair of lead cables of first coil (1220).

The first lower support member (1620) may comprise an external part (1621), an internal part (1622), a connection part (1623) and a terminal part (1624). However, any one or more of the external part (1621), the internal part (1622), the connection part (1623) and the terminal part (1624) may be omitted or changed from the first lower support member (1620).

The external part (1621) may be coupled to the first housing (1310). The external part (1621) may be coupled to a lower surface of first housing (1310).

The internal part (1622) may be coupled to the first bobbin (1210). The internal part (1622) may be coupled to a lower surface of first bobbin (1210).

The connection part (1623) may connect the external part (1621) and the internal part (1622). The connection part (1623) may elastically connect the external part (1621) and the internal part (1622). The connection part (1623) may possess elasticity.

The terminal part (1624) may be extended from the external part (1621). The terminal part (1624) may have a width wider than that of the external part (1621). The terminal part (1624) may be formed with a pad part for soldering. The terminal part (1624) may be coupled to the first substrate (1440). The terminal part (1624) may be coupled to the first substrate (1440) by soldering.

The second camera module may comprise a second lens driving device (2000), a second lens module (not shown), a second infrared filter (not shown), a second PCB (2001), a second image sensor (not shown) and a second controller (not shown). However, any one or more of the second lens driving device (2000), the second lens module, the second infrared filter, the second PCB (2001), the second image sensor and the second controller may be omitted or changed from the second camera module.

The second lens module may comprise a lens and a lens barrel. The second lens module may comprise one or more lenses (not shown) and a lens barrel accommodating one or more lenses. However, one element of second lens module is not limited to the lens barrel, and any holder structure capable of supporting one or more lenses may be sufficient.

The second lens module may move along with a second lens driving device (2000) by being coupled to the second lens driving device (2000). The second lens module may be coupled to an inside of the second lens driving device (2000). The second lens module may be screw-coupled to the second lens driving device (2000). The second lens module may be coupled with the second lens driving device (2000) by an adhesive (not shown). Meantime, a light having passed the second lens module may be irradiated on a second image sensor.

The second infrared filter may serve to inhibit a light of infrared ray region from entering the second image sensor. The second infrared filter may be interposed between the second lens module and the second image sensor. The second infrared filter may be disposed at a holder member (not shown) that is separately disposed from a second base (2500). However, the second infrared filter may be also mounted on an opening (2510) formed at a center of the second base (2500). The second infrared filter may be formed with a film material or a glass material. The second infrared filter may be formed by allowing an infrared cut-off coating material to be coated on a plate-shaped optical filter such as an imaging plane protection cover glass or a cover glass. The second infrared filter may be an infrared cut-off filter or an infrared absorption filter.

The second PCB (2001) may support the second lens driving device (2000). The second PCB (2001) may be mounted with the second image sensor. For example, the second PCB (2001) may be disposed at an inner upper side with the second image sensor and may be disposed at an outer upper side with a second sensor holder (2002). An upper side of the second sensor holder (2002) may be disposed with the second lens driving device (2000). The second sensor holder (2002) may be integrally formed with the second base (2500). Alternatively, the second PCB (2001) may be disposed at an upper outer side with the second lens driving device (2000), and may be disposed at an inner upper side with the second image sensor. Through the said structure, a light having passed the second lens module accommodated at an inside of the second lens driving device (2000) may be irradiated on the second image sensor mounted on the second PCB (2001). The second PCB (2001) may supply a power to the second lens driving device (2000). Meantime, the second PCB (2001) may be disposed with a second controller in order to control the second lens driving device (2000). The first PCB (1001) may be integrally formed with the second PCB (2001).

The second image sensor may be mounted on the second PCB (2001). The second image sensor may be so disposed as to match the second lens module by way of optical axis, through which the second image sensor can obtain a light having passed the second lens module. The second image sensor may output the irradiated light in an image. The second image sensor may be, for example, a CCD (charge coupled device), a MOS (metal oxide semi-conductor), a CPD and a CID. However, the types of second image sensors are not limited thereto.

The second controller may be mounted on the second PCB (2001). The second controller may be disposed at an outside of the second lens driving device (2000). The second controller may be disposed at an inside of the second lens driving device (2000), though. The second controller may control a direction, intensity and an amplitude of a current supplied to each element forming the second lens driving device. The second controller may perform an auto focus function of the second camera module by controlling the second lens driving device (2000). That is, the second controller may move the second lens module to an optical axis direction by controlling the second lens driving device (2000). Furthermore, the second controller may perform a feedback control of the auto focus function. To be more specific, the second controller may provide a more accurate auto focus function by controlling a current or a power supplied to a second coil (2220) by receiving a position of the second bobbin (2220) detected by a second Hall sensor (2430). Furthermore, the second controller may perform an OIS function and feedback control of OIS function.

Figure 8:
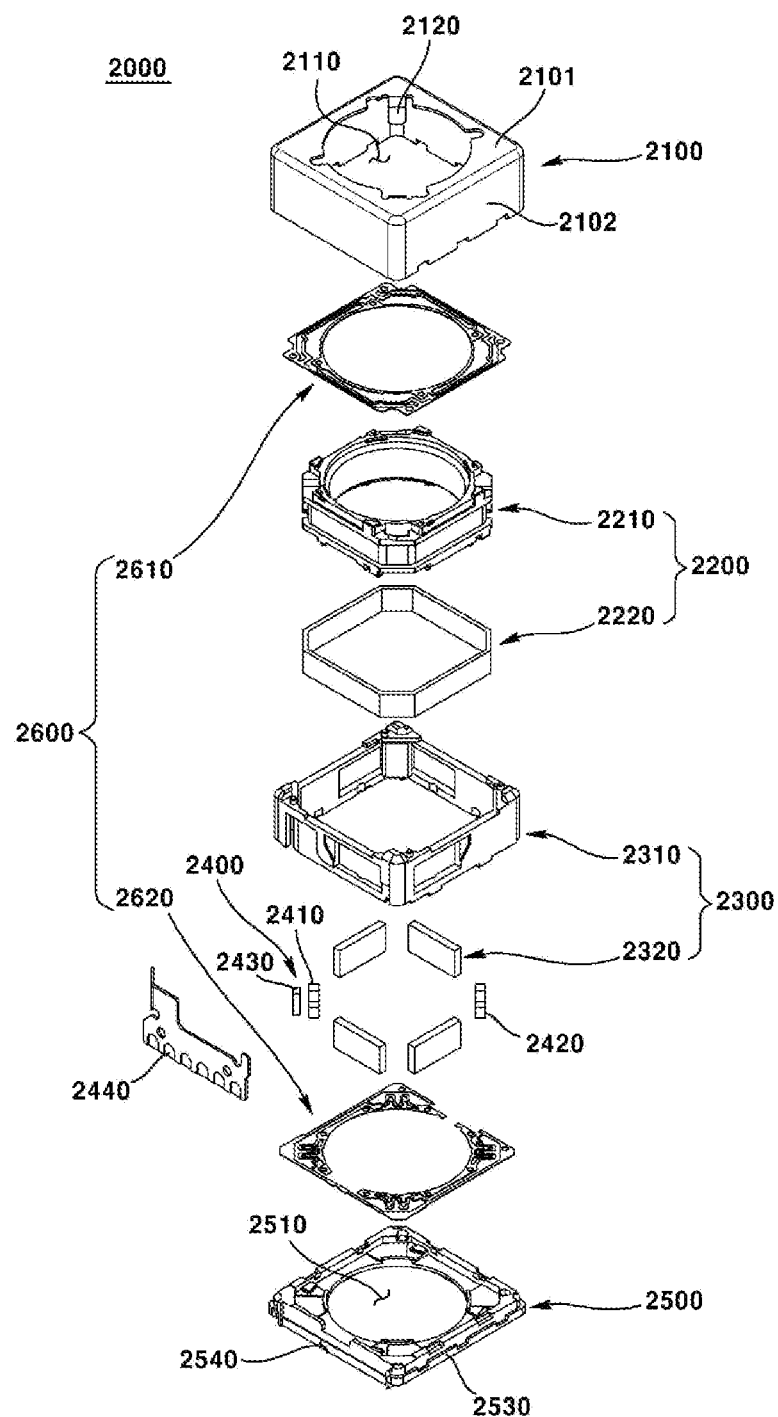
FIG. 8 is an exploded perspective view of a second lens driving device according to an exemplary embodiment of present invention.
Figure 9:
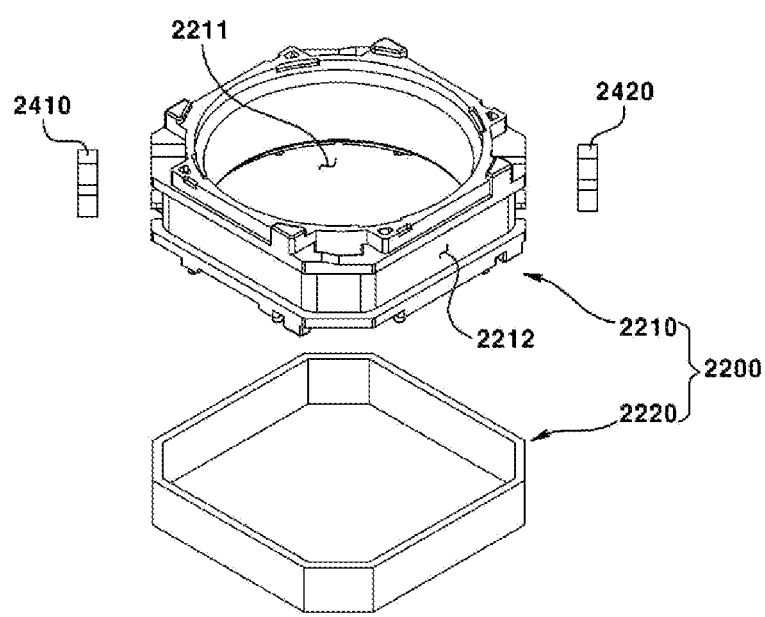
FIG. 9 is an exploded perspective view of a second mover of second lens driving device according to an exemplary embodiment of present invention.
Figure 10:
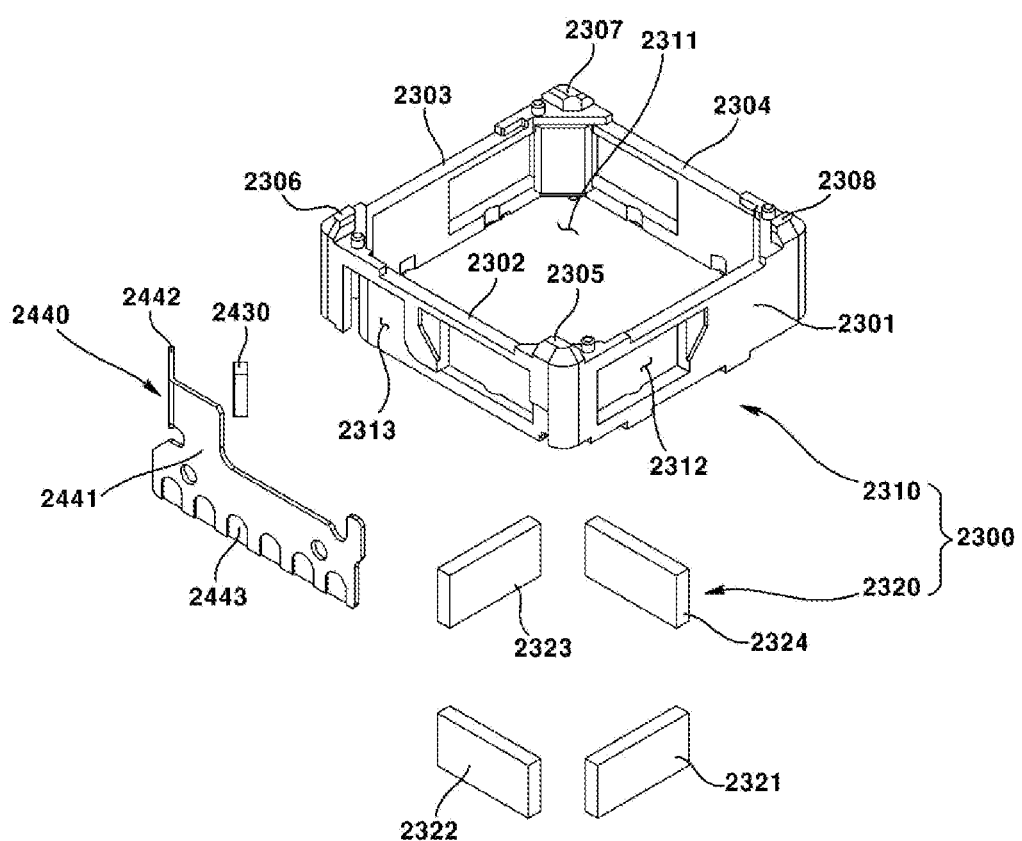
FIG. 10 is an exploded perspective view of some elements at a second stator of second lens driving device and a second AF feedback sensor unit according to an exemplary embodiment of present invention.
Figure 11:
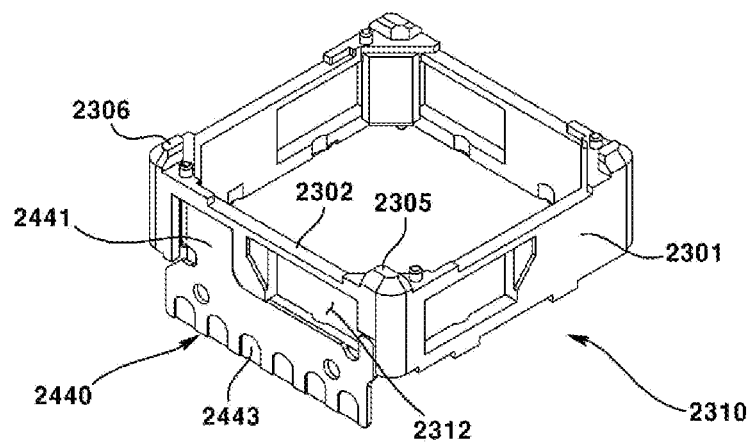
FIG. 11 is a perspective view of a coupled state between a second housing and a second substrate of second lens driving device according to an exemplary embodiment of present invention.
Figure 12:
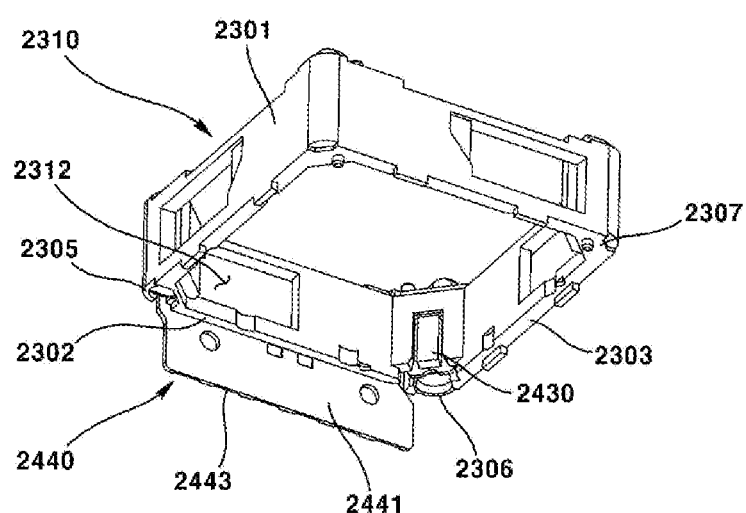
FIG. 12 is a bottom perspective view of a coupled state of a second housing, a second substrate and a second Hall sensor at a second lens driving device according to an exemplary embodiment of present invention.
Figure 13:
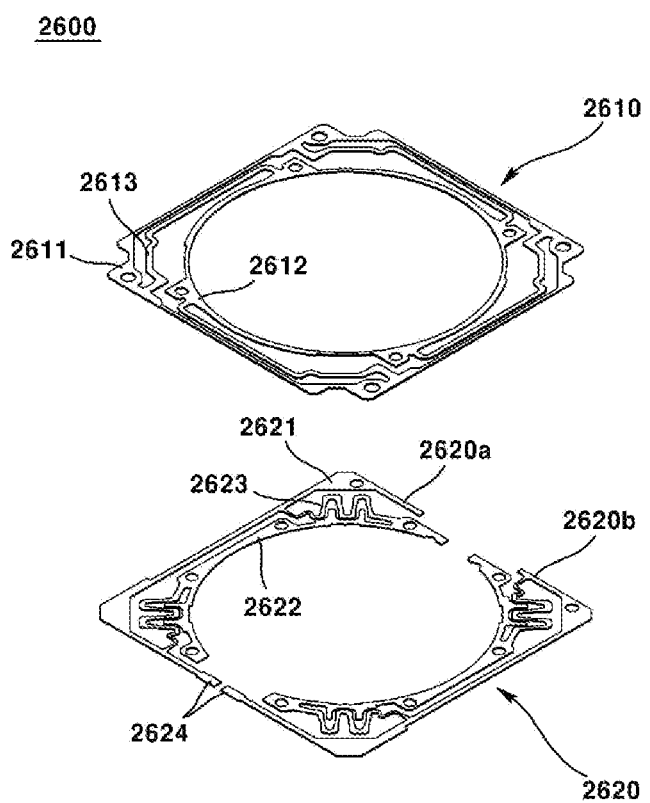
FIG. 13 is an exploded perspective view of a second AF support member of second lens driving device according to an exemplary embodiment of present invention.

FIG. 8 is an exploded perspective view of a second lens driving device according to an exemplary embodiment of present invention, FIG. 9 is an exploded perspective view of a second mover of second lens driving device according to an exemplary embodiment of present invention, FIG. 10 is an exploded perspective view of some elements at a second stator of second lens driving device and a second AF feedback sensor unit according to an exemplary embodiment of present invention, FIG. 11 is a perspective view of a coupled state between a second housing and a second substrate of second lens driving device according to an exemplary embodiment of present invention, FIG. 12 is a bottom perspective view of a coupled state of a second housing, a second substrate and a second Hall sensor at a second lens driving device according to an exemplary embodiment of present invention, and FIG. 13 is an exploded perspective view of a second AF support member of second lens driving device according to an exemplary embodiment of present invention.

The second lens driving device (2000) may be spaced apart from the first lens driving device (1000). The second lens driving device (2000) may be aligned in parallel with the first lens driving device (1000). The second lens driving device (2000) may be so disposed as to allow a surface facing the first lens driving device (1000) to be parallel. A first lateral surface (1301) of first lens driving device (1000) may be disposed in parallel with a fifth lateral surface (2301) of the second lens driving device (2000). The first lateral surface (1301) of first lens driving device (1000) may be overlapped with the fifth lateral surface (2301) of second lens driving device (2000) to a direction perpendicular to a second optical axis. A first cover member (1100) of first lens driving device (1000) may be spaced apart by 1 mm~5 mm from a second cover member (2100) of second lens driving device (2000). That is, a discrete distance (see L of FIG. 14) between the first cover member (1100) and the second cover member (2100) may be 1 mm~5 mm. Alternatively, a discrete distance (L) between the first cover member (1100) and the second cover member (2100) may be 1 mm~3 mm. Alternatively, a discrete distance (L) between the first cover member (1100) and the second cover member (2100) may be 1 mm.

The second lens driving device (2000) may comprise a second cover member (2100), a second mover (2200), a second stator (2300), a second AF feedback sensor unit (2400), a second base (2500) and a second AF support member (2600). However, any one or more of the second cover member (2100), the second mover (2200), the second stator (2300), the second AF feedback sensor unit (2400), the second base (2500) and the second AF support member (2600) may be omitted or changed from the second lens driving device (2000). Particularly, the second AF feedback sensor unit (2400) may be changed or omitted from a first modification and a second modification.

The second cover member (2100) may accommodate a second housing (2310) at an inside thereof. The second cover member (2100) may be integrally formed with the second housing (2310). Alternatively, the second cover member (2100) may be omitted and the second housing (2310) may function as the second cover member (2100). That is, the second cover member (2100) may be the second housing (2310).

The second cover member (2100) may form an exterior shape of the second lens driving device (2000). The second cover member (2100) may take a bottom-opened cubic shape. However, the present invention is not limited thereto. The second cover member (2100) may comprise a non-magnetic substance. If the second cover member (2100) is formed with a magnetic substance, a magnetic force of the second cover member (2100) may be affected to a first sensing magnet (1410) and/or a first compensation magnet (1320). The second cover member (2100) may be formed with a metal material. To be more specific, the second cover member (2100) may be formed with a metal plate. In this case, the second cover member (2100) can shield an EMI (Electro Magnetic Interference). Because of the said characteristics of the second cover member (2100), the second cover member (2100) may be called an "EMI shield can". The second cover member (2100) may shield the electromagnetic waves generated from an outside of the second lens driving device (2000) from entering into the second cover member (2100). Furthermore, the second cover member (2100) may inhibit the electromagnetic waves generated from inside of the second cover member (2100) from being emitted to an outside of the second cover member (2100). However, the material of the first cover member (2100) is not limited thereto.

The second cover member (2100) may comprise an upper plate (2101) and a side plate (2102). The second cover member (2100) may comprise an upper plate (2101) and a side plate (2102) extended from an outside of upper plate (2101) to a lower side. A lower end of the side plate (2102) of second cover member (2100) may be mounted on the second base (2500). A lower end of the side plate (2102) at the second cover member (2100) may be coupled to a staircase part (2540) of the second base (2500). The second cover member (2100) may be adhered to a whole part or to a portion of a side of the second base (2500) to be mounted on the second base (2500). An inner space formed by the second cover member (2100) and the second base (2500) may be disposed with the second mover (2200), the second stator (2300) and the second AF support member (2600). Through this structure, the second cover member (2100) can protect inner elements from the outside shocks and simultaneously inhibit outside foreign objects from entering. However, the present invention is not limited thereto, and the lower end of the side plate (2102) at the second cover member (2100) may be directly coupled to the second PCB (2001) disposed at a lower side of second base (2500). Some elements in a plurality of side plates (2102) may face a second cover member (2100).

The second cover member (2100) may comprise an opening (2110) and an extension (2120). However, the extension part (2120) may be omitted or changed from the second cover member (2100).

The opening (2110) may be formed at an upper plate (2101). The opening (2110) may expose the second lens module. The opening (2110) may be formed with a shape corresponding to that of the second lens module. The opening (2110) may be formed to be larger in size than a diameter of the second lens module to allow the second lens module to be assembled through the opening (2110). Meantime, a light introduced into through the opening (2110) may pass through the second lens module. At this time, the light having passed the second lens module may be obtained by the second image sensor as an image.

The extension part (2120) may be formed by being bent from an inside surface of the upper plate (2101) to a lower side. The extension part (2120) may be called an "inner yoke". At least one portion of extension part (2120) may be inserted into a groove formed on a second bobbin (2210). Through this structure, the second bobbin (2210) may be inhibited from a phenomenon of being rotated in the screw-coupling process of the second lens module to the second bobbin (2210). Even in other situations, the extension part (2120) can inhibit the second bobbin (2210) from rotating relative to the second cover member (2100).

The second mover (2200) may be coupled with the second lens module. The second mover (2200) may accommodate the second lens module into an inside thereof. An inside surface of the second mover (2200) may be coupled with an outside surface of second lens module. The second mover (2200) may move integrally with the second lens module through an electromagnetic interaction with the second stator (2300). The second mover (2200) may comprise a second bobbin (2210) and a second coil (2220). However, any one or more of the second bobbin (2210) and the second coil (2220) may be omitted or changed from the second mover (2200).

The second bobbin (2210) may be disposed at an inside of a second housing (2310). The second bobbin (2210) may be accommodated into a through hole (2311) of the second housing (2310). The second bobbin (2210) may be coupled with the second lens module. To be more specific, an inside surface of second bobbin (2210) may be coupled with an outside surface of second lens module. The second bobbin (2210) may be coupled with the second coil (2220). A lower surface of second bobbin (2210) may be coupled with a second lower support member (2620). An upper surface of second bobbin (2210) may be coupled with a second upper support member (2610). The second bobbin (2210) may move to an optical axis direction relative to the second housing (2310).

The second bobbin (2210) may comprise a through hole (2211) and a coil reception part (2212). However, any one or more of the through hole (2211) and the coil reception part (2212) may be omitted or changed from the second bobbin (2210).

The through hole (2211) may be formed at an inside of the second bobbin (2210). The through hole (2211) may be formed with upper/lower sides-opened shape. The through hole (2211) may be coupled with the second lens module. The through hole (2211) may be formed at an inside surface with a screw thread of a shape corresponding to that formed at an outside of the second lens module. That is, the through hole (2211) may be screw-coupled with the second lens module. An adhesive may be interposed between the second lens module and the second bobbin (2210). At this time, the adhesive may be an epoxy hardened by heat, UV or laser. That is, the second lens module and the second bobbin (2210) may be coupled by a UV-hardening epoxy and/or heat-hardening epoxy.

The coil reception part (2212) may accommodate at least one portion of the second coil (2220). The coil reception part (2212) may be integrally formed with an outside surface of second bobbin (2210). Furthermore, the coil reception part (2212) may be continuously formed along an outside surface of second bobbin (2210) or may be spaced apart from the outside surface of second bobbin (2210) at a predetermined gap. For example, the coil reception part (2212) may be formed by allowing a portion of the outside surface of the second bobbin (2210) to be recessed in a shape corresponding to that of the second coil (2220). At this time, the second coil (2220) may be directly wound on a second driving part coupling part (2212). As a modification, the coil reception part (2212) may be formed by allowing an upper side or a lower side to be opened. At this time, the second coil (2220) may be inserted into and coupled with the coil reception part (2212) through the opened portion while being in a pre-wound state.

The second coil (2220) may be disposed at the second bobbin (2210). The second coil (2220) may be disposed at an outside surface of the second bobbin (2210). The second coil (2220) may be directly wound on an outside surface of second bobbin (2210). The second coil (2220) may mutually and electromagnetically interact with the second driving magnet (2320).

The second coil (2220) may face the second driving magnet (2320). In this case, when a current is supplied to the second coil (2220) to allow forming a magnetic field about the second coil (2220), the second coil (2220) may move relative to the second driving magnet (2320) in response to the electromagnetic interaction between the second coil (2220) and the second driving magnet (2320). The second coil (2220) may move for AF driving. In this case, the second coil (2220) may be called an "AF coil".

The second coil (2220) may comprise a pair of lead cables (not shown) for power supply. The pair of lead cables at the second coil (2220) may be electrically connected to the second lower support member (2620). Each of the lead cables of the second coil (2220) may be respectively connected to first and second support units (2620a, 2620b). In this case, an electric power may be supplied to the second coil (2220) through the second lower support member (2620) electrically connected to the second PCB (2001) through a terminal part (2624).

The second stator (2300) may accommodate the second mover (1200) at an inside thereof. The second stator (2300), as a fixed member, may move the second mover (2200) through an electromagnetic interaction. The second stator (2300) may comprise a second housing (2310) and a second driving magnet (2320). However, any one or more of the second housing (2310) and the second driving magnet (2320) may be omitted or changed from the second stator (2300).

The second housing (2310) may be disposed at an outside of the second bobbin (2210). The second housing (2310) may be spaced apart from the second bobbin (2210). At least one portion of the second housing (2310) may be formed with a shape corresponding to that of an inside surface of the second cover member (2100).

Particularly, an outside surface of the second housing (2310) may be formed with a shape corresponding to that of an inside surface of lateral plate (2102) of the second cover member (2100). The second housing (2310) may take a cubic shape comprising four side surfaces, for example. However, the shape of second housing (2310) may be formed with any shape as long as the second housing (2310) can be disposed inside the second cover member (2100). The second housing (2310) may be formed with an insulation material. The second housing (2310) may be formed with an injection in consideration of productivity. The second housing (2310) may be fixed on the second base (2500). As a modification, the second housing (2310) may be omitted and the second magnet unit (2320) may be fixed to the second cover member (2100). An upper surface of second housing (2310) may be coupled with a second upper support member (2610). The second housing (2310) may be coupled at a lower side with a second lower support member (2620).

The second housing (2310) may comprise fifth to eighth side surfaces (2301, 2302, 2303, 2304). The second housing (2310) may comprise continuously disposed fifth to eighth side surfaces (2301, 2302, 2303, 2304). The second housing (2310) may comprise a fifth side surface (2301) disposed with a fifth magnet (2321), a sixth side surface (2302) disposed with a sixth magnet (2322), a seventh side surface (2303) disposed with a seventh magnet (2323) and an eighth side surface (2304) disposed with an eighth magnet (2324). The fifth side surface (2301) of the second housing (2310) of the second lens driving device (2000) may face a first side surface (1301) of first housing (1310) of the first lens driving device (1000). The second housing (2310) may comprise a fifth side surface (2301) facing the first side surface (1301), a seventh side surface (2303) disposed opposite to the fifth side surface (2301), and sixth and eighth side surfaces (2302, 2304) mutually oppositely disposed between the fifth and seventh side surfaces (2301, 2303).

The second housing (2310) may comprise fifth to eighth corner portions (2305, 2306, 2307, 2308). The second housing (2310) may comprise fifth to eighth corner portions (2305, 2306, 2307, 2308) disposed among fifth to eighth side surfaces (2301, 2302, 2303, 2304). The fifth corner portion (2305) may be interposed between fifth and sixth side surfaces (2301, 2302). The sixth corner portion (2306) may be interposed between sixth and seventh side surfaces (2302, 2303). The seventh corner portion (2307) may be interposed between seventh and eighth side surfaces (2303, 2304). The eighth corner portion (2308) may be interposed between the eighth and fifth side surfaces (2304, 2301).

The second housing (2310) may comprise a through hole (2311), a magnet reception part (2312), a sensor reception part (2313). However, any one or more of the through hole (2311), the magnet reception part (2312) and the sensor reception part (2313) may be omitted or changed from the second housing (2310).

The through hole (2311) may be formed at an inside of the second housing (2310). The through hole (2311) may be opened at an upper side and a lower side. The through hole (2311) may be accommodated by the second bobbin (2210). The through hole (2311) may be movably disposed with the second bobbin (2210). The through hole (2310) may be formed with a shape corresponding to that of the second bobbin (2210).

The magnet reception part (2312) may be formed at a side surface of the second housing (2310). The magnet reception part (2312) may be formed with a hole to pass through the second housing (2310). Alternatively, the magnet reception part (2312) may be formed with a hole formed by allowing a portion of the second housing (2310) to be recessed. The magnet reception part (2312) may accommodate at least a portion of the second magnet unit (2320). An adhesive (not shown) may be interposed between the second magnet unit (2320) and the magnet reception part (2312). That is, the second magnet unit (2320) and the magnet reception part (2312) may be coupled by an adhesive. The magnet reception part (2312) may be disposed at an inside surface of second housing (2310). The magnet reception part (2312) may be formed by allowing a portion of an inside of the second housing (2310) to be outwardly recessed. In this case, the electromagnetic interaction with the second coil (2220) disposed at an inside of the second magnet unit (2320) may be advantageously implemented.

The sensor reception part (2313) may be formed at the second housing (2310). The sensor reception part (2313)

may be formed at the sixth side surface (2302) of second housing (2310). The sensor reception part (2313) may be formed at an outside of the second housing (2310). The sensor reception part (2313) may be formed at an outside of the second housing (2310) by being recessed inwardly. The sensor reception part (2313) may accommodate at least a portion of the second Hall sensor (2430) and at least a portion of the second substrate (2440). The sensor reception part (2313) may be formed with a shape corresponding to that of the second Hall sensor (2430) and to that of the second substrate (2440).

The second driving magnet (2320) may be disposed at the second housing (2310). The second driving magnet (2320) may be arranged at the second housing (2310). The second driving magnet (2320) may be accommodated into the magnet reception part (2312) of second housing (2310). The second driving magnet (2320) may electromagnetically interact with the second coil (2220). The second driving magnet (2320) may face the second coil (2220). The second driving magnet (2320) may move the second bobbin (2210) fixed at the second coil (2220). The second driving magnet (2320) may move the second coil (2220) for AF driving. In this case, the second driving magnet (2320) may be called an "AF magnet".

The second driving magnet (2320) may comprise fifth to eighth magnets (2321, 2322, 2323, 2324). The second driving magnet (2320) may comprise the fifth to eighth magnets (2321, 2322, 2323, 2324), each spaced apart from the other. The second driving magnet (2320) may comprise the fifth to eighth magnets (2321, 2322, 2323, 2324) respectively disposed on the fifth to eighth side surfaces (2301, 2302, 2303, 2304) of the second housing (2310). The second driving magnet (2320) may comprise a fifth magnet (2321) disposed at the fifth side surface (2301) of second housing (2310). The second driving magnet (2320) may comprise a sixth magnet (2322) disposed at the sixth side surface (2302) of second housing (2310). The second driving magnet (2320) may comprise a seventh magnet (2323) disposed at the seventh side surface (2303) of second housing (2310). The second driving magnet (2320) may comprise an eighth magnet (2324) disposed at the eighth side surface (2304) of second housing (2310).

The fifth magnet (2321) may be disposed at the fifth side surface (2301) of second housing (2310). The fifth magnet (2321) may be disposed closer to the fifth corner portion (2305) than to the eighth corner portion (2308). The sixth magnet (2322) may be disposed at the sixth side surface (2302) of second housing (2310). The sixth magnet (2322) may be disposed closer to the fifth corner portion (2305) than to the sixth corner portion (2306). The seventh magnet (2323) may be disposed at the seventh side surface (2303) of second housing (2310). The seventh magnet (2323) may be disposed closer to the seventh corner portion (2307) than to the sixth corner portion (2306). The eighth magnet (2324) may be disposed at the eighth side surface (2304) of second housing (2310). The eighth magnet (2324) may be disposed closer to the seventh corner portion (2307) than to the eighth corner portion (2308).

The fifth to eighth magnets (2321, 2322, 2323, 2324) may be mutually symmetrical based on a second optical axis. The fifth magnet (2321) may be symmetrical with the seventh magnet (2323) based on the second optical axis. The fifth magnet (2321) may be disposed at a position symmetrical with the seventh magnet (2323) based on the second optical axis. The fifth magnet (2321) may be disposed with a size and a shape corresponding to the seventh magnet (2323) about the second optical axis. The sixth magnet (2322) may be symmetrical with the eighth magnet (2324) about the second optical axis. The sixth magnet (2322) may be disposed at a position symmetrical with the eighth magnet (2324) based on the second optical axis. The sixth magnet (2322) may be disposed with a size and a shape corresponding to the eighth magnet (2324) about the second optical axis.

Each of the fifth to eighth magnets (2321, 2322, 2323, 2324) may take a flat plate shape. In this case, each of the fifth to eighth magnets (2321, 2322, 2323, 2324) may be called a "flat plate magnet". Each N pole of the fifth to eighth magnets (2321, 2322, 2323, 2324) may be so disposed as to face an inside. Each S pole of the fifth to eighth magnets (2321, 2322, 2323, 2324) may be so disposed as to face an inside.

The fifth to eighth magnets (2321, 2322, 2323, 2324) may be symmetrical with first to fourth magnets (1321, 1322, 1323, 1324) about a first virtual line which is an imaginary straight line. The first virtual line may be disposed on a plane surface comprising the first and second optical axes, and may be parallel with the first and second optical axes. Furthermore, the first virtual line may be equidistantly spaced apart from the first and second optical axes.

The fifth magnet (2321) may not be overlapped with the first magnet (1321) to a direction perpendicular to the second optical axis. Furthermore, the fifth magnet (2321) may be overlapped within a 30% area facing the first magnet (1321) to a direction perpendicular to the second optical axis. Alternatively, the fifth magnet (2321) may be overlapped within a 50% area facing the first magnet (1321) to a direction perpendicular to the second optical axis.

The second coil (2220) may have eight side surfaces, and the second driving magnet (2320) may be so disposed as to face any one side surface of the eight side surfaces of second coil (2220). A length of second driving magnet (2320) may be shorter than a length of a surface facing the second coil (2220). The second coil (2220) may have eight side surfaces, and the second sensing magnet (2410) may be so disposed as to face any one side surface of the eight side surfaces of second coil (2220). The second coil (2220) may have eight side surfaces, and the second compensation magnet (2420) may be so disposed as to face any one side surface of eight side surfaces of second coil (2220).

The second AF feedback sensor unit (2400) may provide position information of a lens module by detecting the position information of lens module for auto focus feedback function.

The second AF feedback sensor unit (2400) may comprise a second sensing magnet (2410), a second Hall sensor (2430) and a second substrate (2440). However, any one or more of the second sensing magnet (2410), the second Hall sensor (2430) and the second substrate (2440) may be omitted or changed from the second AF feedback sensor unit (2400).

The second compensation magnet (2420) may be appreciated as a member included in the second AF feedback sensor unit (2400) and may be a member disposed for magnetic balance with the second sensing magnet (2410). Alternatively, the second compensation magnet (2420) may be appreciated as a member separate from the second AF feedback sensor unit (2400).

The second sensing magnet (2410) may be disposed on the second bobbin (2210). The second sensing magnet (2410) may be arranged on the second bobbin (2210). The second sensing magnet (2410) may be detected by the second Hall sensor (2430). The second sensing magnet (2410) may be disposed at a corner of the second bobbin (2210). The second sensing magnet (2410) may be so disposed as to face a sixth corner portion (2306) of second housing (2310). The second sensing magnet (2410) may be disposed on a virtual straight line connecting the sixth corner portion (2306) and the eighth corner portion (2308).

The second sensing magnet (2410) may be symmetrical with the second compensation magnet (2420) about the second bobbin (2210). The second sensing magnet (2410) may have a magnetism corresponding to that of the second compensation magnet (2420). The second sensing magnet (2410) may be disposed at one side of second bobbin (2210). The second sensing magnet (2410) may be overlapped with the second coil (2220) to a direction perpendicular to the second optical axis.

The second sensing magnet (2410) may be disposed at an inside of the second coil (2220). The second coil (2220) may comprise eight side surfaces, and the second sensing magnet (2410) may be so disposed as to be arranged at an inside of the second coil (2220) in order to face any one side surface of eight side surfaces of second coil (2220). The second sensing magnet (2410) may be disposed at an outside of second coil (2220). The second sensing magnet (2410) may be interposed between the second Hall sensor (2430) and the second coil (2220). In this case, a detected value detected by the second Hall sensor (2430) may be increased because a distance between the second sensing magnet (2410) and the second Hall sensor (2430) is shortened when compared with a case where the second sensing magnet (2410) is disposed at an inside of the second coil (2220). The second sensing magnet (2410) may be magnetized at four poles and may be disposed in consideration of a relative position with the second Hall sensor (2430) to allow using only a section where a Hall output is a positive number. The second sensing magnet (2410) may be so disposed as to allow an S pole to be formed at an inner upper side, to allow an N pole to be formed at an upper outside, to allow an N pole to be formed at a lower inner side, and to allow an S pole to be formed at a lower outer side.

The second compensation magnet (2420) may be so disposed as to form a magnetic force balance with the second sensing magnet (2410). The second compensation magnet (2420) may be disposed at the second bobbin (2210). The second compensation magnet (2420) may be arranged on the second bobbin (2210). The second compensation magnet (2420) may be symmetrical with the second sensing magnet (2410) about the second optical axis. The second compensation magnet (2420) may be symmetrical with the second sensing magnet (2410) about the second bobbin (2210). The second compensation magnet (2420) may have a magnetism corresponding to that of the second sensing magnet (2410). The second compensation magnet (2420) may be disposed at the other side corresponding to an opposite side of one side of second bobbin (2210) disposed with the second sensing magnet (2410). The second compensation magnet (2420) may be disposed on a virtual straight line connecting the sixth corner portion (2306) and the eighth corner portion (2308). The second compensation magnet (2420) may be symmetrically disposed with the second sensing magnet (2410) about the second optical axis. Through this configuration, an electromagnetic balance between the second sensing magnet (2410) and the second compensation magnet (2420) may be realized. As a result, the second sensing magnet (2410) can minimize an influence affected on the electromagnetic interaction between the second coil (2220) and the second driving magnet (2320).

The second compensation magnet (2420) may be disposed at an inside of second coil (2220). The second coil (2220) may comprise eight side surfaces, and the second compensation magnet (2420) may be disposed at an inside of the second coil (2220) to allow facing any one side surface of the eight side surfaces of second coil (2220). The second compensation magnet (2420) may be disposed at an outside of second coil (2220).

The second Hall sensor (2430) may be disposed at the second housing (2310). The second Hall sensor (2430) may be arranged on the second housing (2310). The second Hall sensor (2430) may be disposed at a corner portion of second housing (2310). The second Hall sensor (2430) may be disposed at a corner portion most spaced apart from the first sensing magnet (1410) among a plurality of corner portions of second housing (2310). The second Hall sensor (2430) may be disposed at a corner portion most spaced apart from the first Hall sensor (1430) among a plurality of corner portions of second housing (2310). Through this configuration, the first Hall sensor (1430) and the second Hall sensor (2430) may be maximally spaced apart within a limited space. The second Hall sensor (2430) may be disposed at the sixth corner portion (2306) of second housing (2310). The second Hall sensor (2430) may be interposed between the sixth and seventh side surfaces (2302, 2303). The second Hall sensor (2430) may be disposed on a virtual straight line connecting the sixth corner portion (2306) and the eighth corner portion (2308). That is, all the second Hall sensor (2430), the second sensing magnet (2410) and the second compensation magnet (2420) may be disposed on a virtual straight line connecting the sixth corner portion (2306) of first housing (2310) and the eighth corner portion (2308).

The second Hall sensor (2430) may be disposed at the second substrate (2440). The second Hall sensor (2430) may be coupled with the second substrate (2440). The second Hall sensor (2430) may be electrically connected to the second substrate (2440). The second Hall sensor (2430) may be mounted on the second substrate (2440). The second Hall sensor (2430) may be coupled to the second substrate (2440) by way of SMT (Surface Mounter Technology). The second Hall sensor (2430) may be mounted on a sensor mounting part (2442) of second substrate (2440). The second Hall sensor (2430) may detect the second sensing magnet (2410). The second Hall sensor (2430) may comprise a Hall IC detecting a magnetic field of a magnet. The second Hall sensor (2430) may comprise a Hall-integrated driver. The second Hall sensor (2430) may comprise a temperature detection function.

The second Hall sensor (2430) may be fixed to the second housing (2310) and the second sensing magnet (2410) may be fixed to the second bobbin (2210). When the second sensing magnet (2410) is moved along with the second bobbin (2210), a magnetic flux density detected by a Hall IC inside the second Hall sensor (2430) may be changed in response to a relative position between the second Hall sensor (2430) and the second sensing magnet (1410). The second Hall sensor (2430) may detect a position of second lens module using an output voltage of Hall IC that is proportionate to a magnetic flux density changing in response to a relative position between the second Hall sensor (2430) and the second sensing magnet (2410).

The second substrate (2440) may be disposed on the second housing (2310). The second substrate (2440) may be coupled by the second Hall sensor (2430). The second substrate (2440) may be mounted with the second Hall sensor (2430). The second substrate (2440) may be so formed as to be disposed at a lateral surface of one side of the second housing (2310). The second substrate (2440) may be so formed as to allow the second Hall sensor (2430)

mounted on the second substrate (2440) to be disposed at a corner of the second housing (2310). At least one portion of the second substrate (2440) may be accommodated into the sensor reception part (2313) formed on the second housing (2310). The second substrate (2440) may be fixed by an adhesive while being inserted into the sensor reception part (2313) of second housing (2310). The second substrate (2440) may be configured in such a manner that a body part (2441) is disposed at an outside of second housing (2310) while being inserted into the sensor reception part (2313) of second housing (2310), and the sensor mounting part (2442) may be disposed at an inside of second housing (2310). Through this configuration, a staircase part (2443) disposed at a lower side of the body part (2441) may be eased to be coupled with an outside element for electrical conductivity, and the second Hall sensor (2430) mounted on an inside of the sensor mounting part (2442) can detect the inside-disposed second sensing magnet (2410) at a high output. A portion of second substrate (2440) may be extended along a lateral surface of one side of second base (2500). The second substrate (2440) may be an FPCB (Flexible Printed Circuit Board). However, the present invention is not limited thereto. The second substrate (2440) may be electrically connected to a second lower support member (2620). The second substrate (2440) may be coupled to a staircase part (2624) of second lower support member (2620).

The second substrate (2440) may comprise a body part (2441), a sensor mounting part (2442) and a terminal part (2443). However, any one or more of the body part (2441), the sensor mounting part (2442) and the terminal part (2443) may be omitted or changed from the second substrate (2440).

The body part (2441) may be accommodated into the sensor reception part (2313) of second housing (2310). The body part (2441) may not be overlapped with the sixth magnet (2322) of second driving magnet (2320) to a direction perpendicular to the second optical axis of sixth magnet (2322). A lateral surface at one side of body part (2441) may be extended by the sensor mounting part (2442). An inner surface of body part (2441) may be coupled by an outer surface of second housing (2310) by an adhesive.

The sensor mounting part (2442) may be extended from a lateral surface of one side of body part (2441). The sensor mounting part (2442) may be coupled by a second Hall sensor (2430). The sensor mounting part (2442) may be mounted with the second Hall sensor (2430). The sensor mounting part (2442) may be bent from the body part (2441). The sensor mounting part (2442) may be accommodated into the sensor reception part (2313) of second housing (2310).

The terminal part (2443) may be downwardly extended from the body part (2441). The terminal part (2443) may be downwardly extended from a center of one lateral surface of one side of the second housing (2310). The terminal part (2443) may be exposed to an outside. At least one portion of terminal part (2443) may be more downwardly protruded than the second cover member (2100). The terminal part (2443) of second substrate (2440) may be coupled to a terminal part (2624) of second lower support member (620) by way of soldering. The terminal part (2443) may be electrically connected to the second PCB (2001). The terminal part (2443) may be coupled to the second PCB (2001) by way of soldering.

The second base (2500) may be disposed at a lower side of the second housing (2310). The second base (2500) may be disposed at an upper surface of second PCB (2001). The second base (2500) may be coupled by a second infrared filter.

The second base (2500) may comprise an opening (2510), a terminal reception groove (2520) and a staircase part (2530). However, any one or more of the opening (2510), the terminal reception groove (2520) and the staircase part (2530) may be omitted or changed from the second base (2500).

The opening (2510) may be formed at a center of second base (2500). The opening (2510) may be so formed as to vertically penetrate the second base (2500). The opening (2510) may be overlapped with the second lens module to an optical axis direction. The opening (2510) may pass through a light having passed the second lens module.

The terminal reception groove (2520) may be formed at a lateral surface of second base (2500). The terminal reception groove (2520) may be formed by allowing a portion of lateral surface of outside at the second base (2500) to be inwardly recessed. The terminal reception groove (2520) may accommodate at least one portion of terminal part (2443) at the second substrate (2440). The terminal reception groove (2520) may be formed with a width corresponding to that of the terminal part (2443).

The staircase part (2530) may be formed at a lower end of outside at the second base (2500). The staircase part (2530) may be so formed as to be outwardly protruded from an outer surface of second base (2500). The staircase part (2530) may support a lower end of side plate (2102) of second cover member (2100).

The second AF support member (2600) may be coupled to the second bobbin (2210) and to the second housing (2310). The second AF support member (2600) may movably support the second bobbin (2210) along a second optical axis. The second AF support member (2600) may elastically support the second bobbin (2210). The second AF support member (2600) may movably support the second bobbin (2210) relative to the second housing (2310). At least one portion of second AF support member (2600) may have elasticity.

The second AF support member (2600) may comprise a second upper support member (2610) and a second lower support member (2620). However, any one or more of the second upper support member (2610) and the second lower support member (2620) may be omitted or changed from the second AF support member (2600).

The second upper support member (2610) may be coupled to an upper surface of second bobbin (2210) and to an upper surface of second housing (2310). The second upper support member (2610) may be integrally formed.

The second upper support member (2610) may comprise an external part (2611), an internal part (2612) and a connection part (2613). However, any one or more of the external part (2611), the internal part (2612) and the connection part (2613) may be omitted or changed from the second upper support member (2610).

The external part (2611) may be coupled to the second housing (2310). The external part (2611) may be coupled to an upper surface of second housing (2310).

The internal part (2612) may be coupled to the second bobbin (2210). The internal part (2612) may be coupled to an upper surface of second bobbin (2210).

The connection part (2613) may connect the external part (2611) and the internal part (2612). The connection part (2613) may elastically connect the external part (2611) and the internal part (2612). The connection part (2613) may possess elasticity.

The second lower support member (2620) may be coupled to a lower surface of second bobbin (2210) and to a lower surface of second housing (2310). The second upper support member (2610) may be electrically connected to the second coil (2220). The second lower support member (2620) may comprise third and fourth support units (2620a, 2620b). The third and fourth support units (2620a, 2620b) may respectively be coupled to a pair of lead cables of second coil (2220).

The second lower support member (2620) may comprise an external part (2621), an internal part (2622), a connection part (2623) and a terminal part (2624). However, any one or more of the external part (2621), the internal part (2622), the connection part (2623) and the terminal part (2624) may be omitted or changed from the second lower support member (2620).

The external part (2621) may be coupled to the second housing (2310). The external part (2621) may be coupled to a lower surface of second housing (2310).

The internal part (2622) may be coupled to the second bobbin (2210). The internal part (2622) may be coupled to a lower surface of second bobbin (2210).

The connection part (2623) may connect the external part (2621) and the internal part (2622). The connection part (2623) may elastically connect the external part (2621) and the internal part (2622). The connection part (2623) may possess elasticity.

The terminal part (2624) may be extended from the external part (2621). The terminal part (2624) may have a width wider than that of the external part (2621). The terminal part (2624) may be formed with a pad part for soldering. The terminal part (2624) may be coupled to the second substrate (2440). The terminal part (2624) may be coupled to the second substrate (2440) by way of soldering.

Figure 14:
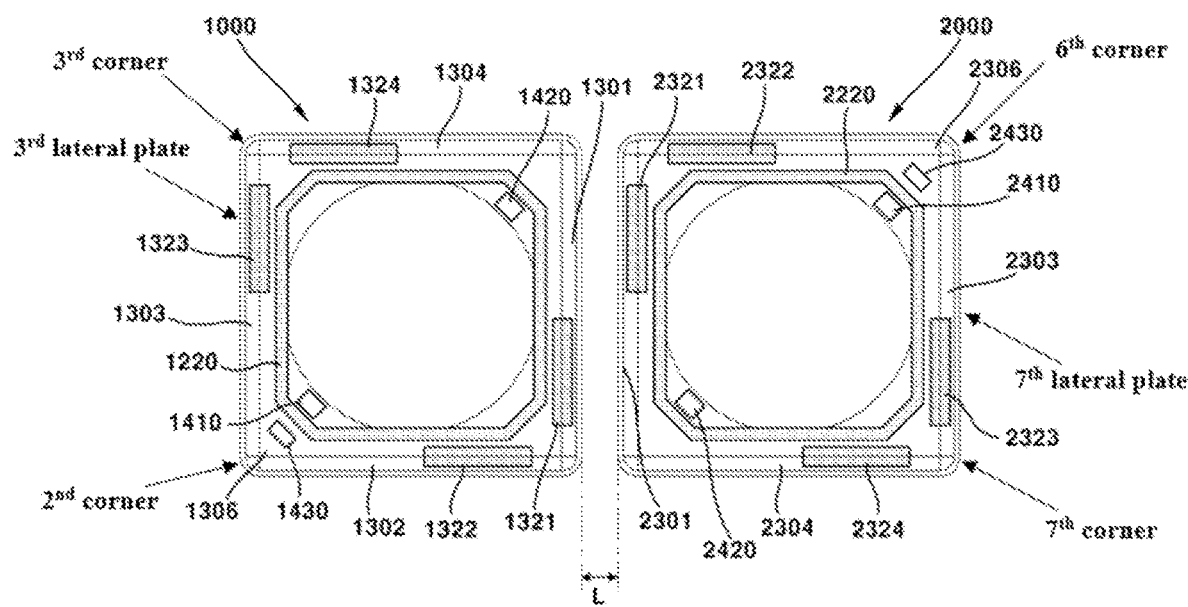
FIG. 14 is a perspective drawing of some elements in a dual camera module seen from a plane according to an exemplary embodiment of present invention.

FIG. 14 is a perspective drawing of some elements in a dual camera module seen from a plane according to an exemplary embodiment of present invention.

Referring to FIG. 14, it can be ascertained from FIG. 14 that the first lens driving device (1000) and the second lens driving device (2000) are spaced apart in parallel. At this time, the first lens driving device (1000) and the second lens driving device (2000) may be spaced apart by a discrete distance of 1 mm~5 mm. The first Hall sensor (1430) may be disposed at the second corner portion (1306) of first housing (1310) and the second Hall sensor (2430) may be disposed at the sixth corner portion (2306) of second housing (1320). That is, the first Hall sensor (1430) and the second Hall sensor (2430) may be maximally spaced apart. The first magnet (1321) and the second magnet (1322) may be disposed to be leaned toward a first corner portion (1305) side, and the third magnet (1323) and the fourth magnet (1324) may be disposed to be leaned toward a third corner portion (1307) side. The fifth magnet (2321) and the sixth magnet (2322) may be disposed to be leaned toward a fifth corner portion (2305) side, and the seventh magnet (2323) and the eighth magnet (2324) may be disposed to be leaned toward a seventh corner portion (2307) side.

Particularly, the first to fourth magnets (1321, 1322, 1323, 1324) may be symmetrical with the fifth to eighth magnets (2321, 2322, 2323, 2324) about a first virtual line parallel with the first optical axis and the second optical axis and spaced apart as much as the same distance, the first sensing magnet (1410) may be symmetrical with the second sensing magnet (2410), the first compensation magnet (1420) may be symmetrical with the second compensation magnet (2420) and the first Hall sensor (1430) may be symmetrical with the second Hall sensor (2430).

In the present exemplary embodiment, an influence mutually affected by the first lens driving device (1000) and the second lens driving device (2000) can be minimized through this structure.

Hereinafter, configuration of dual camera module according to a modification will be described with reference to the accompanying drawings.

Figure 15:
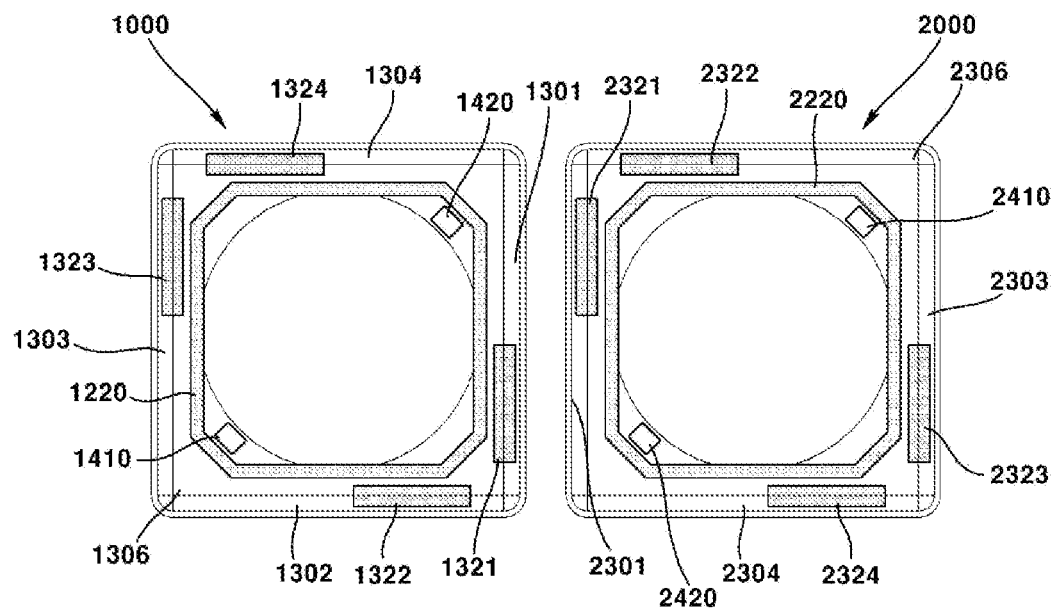
FIG. 15 is a perspective drawing of some elements in a dual camera module seen from a plane according to a first modification of present invention.
Figure 16:
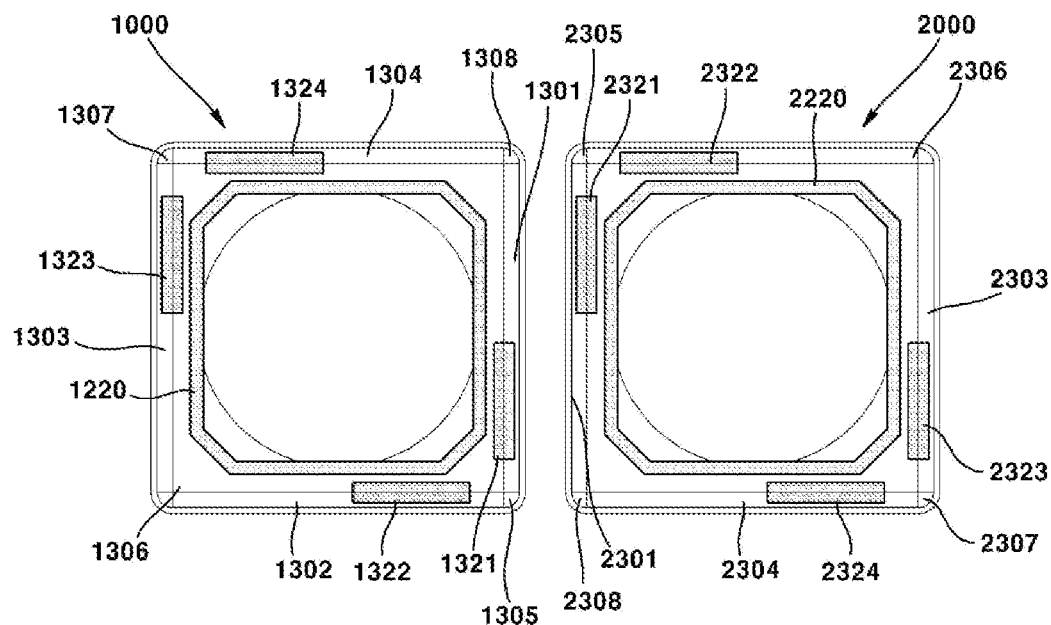
FIG. 16 is a perspective drawing of some elements in a dual camera module seen from a plane according to a second modification of present invention.

FIG. 15 is a perspective drawing of some elements in a dual camera module seen from a plane according to a first modification of present invention, and FIG. 16 is a perspective drawing of some elements in a dual camera module seen from a plane according to a second modification of present invention.

The dual camera module according to a first modification of present invention is omitted with the first Hall sensor (1430) and the second Hall sensor (2430) when compared with the dual camera module according the exemplary embodiment. Thus, explanations about other remaining elements than the first Hall sensor (1430) and the second Hall sensor (2430) in the configuration of dual camera module according to the first modification may be inferably applied by the dual camera module according to the exemplary embodiment.

Even if the first Hall sensor (1430) is omitted as in the first modification, the first sensing magnet (1410) and the first compensation magnet (1420) may be disposed. At this time, the first sensing magnet (1410) may be an element for use of magnetic force balance instead of use for feedback function. Thus, the first sensing magnet (1410) in the first modification may be called a "first balancing magnet". Furthermore, the first compensation magnet (1420) in the first modification may be called a "second balancing magnet". As in the first modification, even if the second Hall sensor (2430) is omitted, the second sensing magnet (2410) and the second compensation magnet (2420) may be disposed. At this time, the second sensing magnet (2410) may be an element for use of magnetic force balance instead of use for feedback function. Thus, the second sensing magnet (2410) in the first modification may be called a "third balancing magnet". Furthermore, the second compensation magnet (2420) in the first modification may be called a "fourth balancing magnet".

The first balancing magnet in the first modification may be disposed to be opposite to a corner portion most spaced apart from the third balancing magnet among the plurality of corner portions of first housing (1310). Furthermore, the third balancing magnet may be disposed to be opposite to a corner portion most spaced apart from the first balancing magnet among the plurality of corner portions of second housing (2310). At this time, the first balancing magnet may be disposed at the first bobbin (1210), and the third balancing magnet may be disposed at the second bobbin (2210).

The first balancing magnet, the second balancing magnet, the third balancing magnet and the fourth balancing magnet in the first modification may minimize the influence caused by magnetic interference between the first lens driving device (1000) and the second lens driving device (2000).

The dual camera module according to the second modification is omitted with the first balancing magnet, the second balancing magnet, the third balancing magnet and the fourth balancing magnet compared with the dual camera module according to the first modification. Thus, explanations about other remaining elements than the first Hall sensor (1430), the second Hall sensor (2430), the first balancing magnet, the second balancing magnet, the third balancing magnet and the fourth balancing magnet in the configuration of dual camera module according to the second modification may be inferably applied by the dual camera module according to the exemplary embodiment.

The first driving magnet (1320) in the second modification may comprise a first magnet disposed at a lateral surface of one side of first housing (1310), and the second driving magnet (2320) may comprise a fifth magnet (2321) disposed at a lateral surface of one side of second housing (2310). At this time, a distance between a center of first magnet (1321) and a center of fifth magnet (2321) may be longer than a distance between a lateral surface of one side at the first housing (1310) and a lateral surface of one side at the second housing (2310). That is, the first magnet (1321) and the fifth magnet (2321) may be mutually disposed to be leaned toward an opposite corner portion.

A center of first magnet (1321) and a center of fifth magnet (2321) may be mutually oppositely disposed about a virtual plane comprising an optical axis of first lens driving device and an optical axis of second lens driving device (2000). A center of the first compensation magnet (1420) and a center of first magnet (1321) may be mutually oppositely disposed about a virtual plane. A center of first sensing magnet (1410) and a center of first magnet (1321) may be disposed on a same side about a virtual plane. A center of first Hall sensor (1430) and a center of first magnet (1321) may be disposed on a same side about a virtual plane.

A center of the second compensation magnet (2420) and a center of fifth magnet (2321) may be mutually oppositely disposed about a virtual plane. A center of second sensing magnet (2410) and a center of fifth magnet (2321) may be disposed on a same side about a virtual plane. A center of second Hall sensor (2430) and a center of fifth magnet (2321) may be disposed on a same side about a virtual plane.

The arrangement structure of first driving magnet (1320) and the second driving magnet (2320) according to the second modification may minimize a magnetic force interference between the first lens driving device (1000) and the second lens driving device (2000).

Although the present disclosure has been explained with all constituent elements forming the exemplary embodiments of the present disclosure being combined in one embodiment, or being operated in one embodiment, the present disclosure is not limited thereto. That is, all elements may operate by allowing one or more elements to be selectively combined as long as within the scope of object of the invention.

Furthermore, terms such as "includes", "comprising", "have", "having", "comprises" and/or "comprising" as used herein mean that the relevant elements are embedded, unless otherwise described, such that the mentioned elements are not excluded but may be further included.

Unless otherwise defined, all terms comprising technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The foregoing explanations are intended only to be illustrative of the technical ideas of the present invention, and therefore, it should be appreciated by the skilled in the art that various modifications and amendments to the above examples may be made without deviating from the scope of protection of the invention.

The exemplary embodiments disclosed by the present invention are not to limit the technical ideas of the present invention but to explain the present invention, and therefore, the technical ideas of present invention are not to be limited by the exemplary embodiments.

The scope of protection of the present invention should be interpreted by the following claims and all technical ideas within the equivalent scope should be interpreted as being included in the scope of right of the present invention.

The invention claimed is:

1. A lens driving device comprising:
a first cover member;
a first bobbin disposed in the first cover member;
a first coil disposed on the first bobbin;
a first driving magnet disposed in the first cover member and facing the first coil;
a first sensing magnet disposed on the first bobbin; and
a first Hall sensor configured to detect the first sensing magnet,
wherein the first cover member comprises first and third lateral plates opposite to each other, second and fourth lateral plates opposite to each other, a first corner portion disposed between the first and second lateral plates, a second corner portion disposed between the second and third lateral plates, a third corner portion disposed between the third and fourth lateral plates, and a fourth corner portion disposed between the fourth and first lateral plates,
wherein the first driving magnet comprises a first magnet disposed between the first bobbin and the first lateral plate, a second magnet disposed between the first bobbin and the second lateral plate, a third magnet disposed between the first bobbin and the third lateral plate, and a fourth magnet disposed between the first bobbin and the fourth lateral plate, and
wherein the first sensing magnet and the first Hall sensor are disposed at a position corresponding to the second corner portion.

2. The lens driving device of claim 1, comprising a first compensation magnet disposed on the first bobbin,
wherein the first compensation magnet is disposed at a position corresponding to the fourth corner portion.

3. The lens driving device of claim 1, wherein the first magnet is disposed closer to the first corner portion than to the fourth corner portion,
wherein the second magnet is disposed closer to the first corner portion than to the second corner portion,
wherein the third magnet is disposed closer to the third corner portion than to the second corner portion, and
wherein the fourth magnet is disposed closer to the third corner portion than to the fourth corner portion.

4. The lens driving device of claim 1, wherein the first magnet is not overlapped with the third magnet in a direction from the first lateral plate toward the third lateral plate.

5. The lens driving device of claim 1, wherein the first magnet is parallel to the first lateral plate.

6. The lens driving device of claim 1, wherein the first sensing magnet is disposed in the first coil.

7. The lens driving device of claim 1, comprising:
a first substrate disposed on or in the first cover member; and
a first lower support member coupled to the first bobbin,
wherein the first Hall sensor is disposed on the first substrate, and
wherein the first lower support member electrically connects the first coil and the first substrate.

8. The lens driving device of claim 7, comprising a first housing disposed between the first cover member and the first bobbin,
wherein the first substrate comprises a body part disposed between the second lateral plate of the first cover member and the first housing.

9. The lens driving device of claim 8, wherein the first substrate comprises a sensor mounting part bent from the body part, and
wherein the sensor mounting part of the first substrate is disposed in the first housing.

10. The lens driving device of claim 9, wherein the sensor mounting part and the body part form an obtuse angle.

11. A camera module comprising:
the lens driving device of claim 1; and
a second lens driving device,
wherein the second lens driving device comprises:
a second cover member;
a second bobbin disposed in the second cover member;
a second coil disposed on the second bobbin;
a second driving magnet disposed in the second cover member and facing the second coil;
a second sensing magnet on the second bobbin; and
a second Hall sensor detecting the second sensing magnet,
wherein the first cover member is spaced apart from the second cover member, and
wherein a first optical axis of the first lens driving device is parallel to a second optical axis of the second lens driving device.

12. The camera module of claim 11, wherein the second cover member comprises a fifth lateral plate facing the first lateral plate, a seventh lateral plate opposite to the fifth lateral plate, and sixth and eighth lateral plates opposite to each other, a fifth corner portion disposed between the fifth and sixth lateral plates, a sixth corner portion disposed between the sixth and seventh lateral plates, a seventh corner portion disposed between the seventh and eighth lateral plates, and an eighth corner portion disposed between the eighth and fifth lateral plates, and
wherein the second driving magnet comprises a fifth magnet disposed between the second bobbin and the fifth lateral plate, a sixth magnet disposed between the second bobbin and the sixth lateral plate, a seventh magnet disposed between the second bobbin and the seventh lateral plate, and an eighth magnet disposed between the second bobbin and the eighth lateral plate.

13. The camera module of claim 12, wherein the fifth magnet is disposed closer to the fifth corner portion than to the eighth corner portion, the sixth magnet is disposed closer to the fifth corner portion than to the sixth corner portion, the seventh magnet is disposed closer to the seventh corner portion than to the sixth corner portion, and the eighth magnet is disposed closer to the seventh corner portion than to the eighth corner portion.

14. The camera module of claim 13, wherein the second sensing magnet and the second Hall sensor are disposed at a position corresponding to the sixth corner portion.

15. The camera module of claim 12, wherein the first magnet is not overlapped with the fifth magnet in a direction facing from the first optical axis toward the second optical axis, and
wherein the first magnet is overlapped with the seventh magnet in the direction facing from the first optical axis toward the second optical axis.

16. An optical instrument, comprising:
a main body;
the camera module of claim 11 disposed on the main body to photograph an image of a subject; and
a display configured to display the image photographed by the camera module.

17. A lens driving device comprising:
a first cover member;
a first bobbin disposed in the first cover member;
a first coil disposed on the first bobbin;
a first driving magnet disposed in the cover member and facing the first coil;
a first sensing magnet disposed on the first bobbin;
a first Hall sensor configured to detect the first sensing magnet; and
a first compensation magnet disposed on the first bobbin,
wherein the first cover member comprises first and third lateral plates opposite to each other, second and fourth lateral plates opposite to each other, a first corner portion disposed between the first and second lateral plates, a second corner portion disposed between the second and third lateral plates, a third corner portion disposed between the third and fourth lateral plates, and a fourth corner portion disposed between the fourth and first lateral plates,
wherein the first driving magnet comprises a first magnet disposed between the first bobbin and the first lateral plate, a second magnet disposed between the first bobbin and the second lateral plate, a third magnet disposed between the first bobbin and the third lateral plate, and a fourth magnet disposed between the first bobbin and the fourth lateral plate,
wherein the first compensation magnet is disposed opposite to the first sensing magnet about a first optical axis, and
wherein the first compensation magnet is disposed at a position corresponding to the fourth corner portion.

18. The lens driving device of claim 17, wherein the first magnet is disposed closer to the first corner portion than to the fourth corner portion,
wherein the second magnet is disposed closer to the first corner portion than to the second corner portion,
wherein the third magnet is disposed closer to the third corner portion than to the second corner portion, and
wherein the fourth magnet is disposed closer to the third corner portion than to the fourth corner portion.

19. The lens driving device of claim 17, wherein the first magnet is not overlapped with the third magnet in a direction from the first lateral plate toward the third lateral plate.

20. The lens driving device of claim 17, comprising:
a first substrate disposed on or in the first cover member; and
a first housing disposed between the first cover member and the first bobbin,
wherein the first substrate comprises a body part disposed between the second lateral plate of the first cover member and the first housing.

* * * * *